(12) United States Patent
Kindaichi et al.

(10) Patent No.: US 10,367,990 B2
(45) Date of Patent: *Jul. 30, 2019

(54) PHOTOGRAPHING APPARATUS, PHOTOGRAPHING METHOD AND RECORDING MEDIUM ON WHICH PHOTOGRAPHING/DISPLAY PROGRAM IS RECORDED

(71) Applicant: OLYMPUS CORPORATION, Hachioji-shi, Toyo (JP)

(72) Inventors: Takeshi Kindaichi, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 15/668,255

(22) Filed: Aug. 3, 2017

(65) Prior Publication Data

US 2017/0359502 A1 Dec. 14, 2017

Related U.S. Application Data

(63) Continuation of application No. 14/589,529, filed on Jan. 5, 2015, now Pat. No. 9,756,235, which is a
(Continued)

(30) Foreign Application Priority Data

Sep. 17, 2013 (JP) .................................. 2013-192252

(51) Int. Cl.
*H04N 5/232* (2006.01)
*G02B 7/28* (2006.01)
(Continued)

(52) U.S. Cl.
CPC ........... *H04N 5/23212* (2013.01); *G02B 7/28* (2013.01); *G02B 7/36* (2013.01); *G03B 13/24* (2013.01);
(Continued)

(58) Field of Classification Search
CPC ........... H04N 5/23212; H04N 5/23293; H04N 5/357; H04N 5/23219; H04N 5/23222;
(Continued)

(56) References Cited

U.S. PATENT DOCUMENTS 7,483,054 B2    1/2009   Lin
7,844,176 B2 *   11/2010   Kunishige .............. G03B 13/36
                                                       348/353
(Continued)

FOREIGN PATENT DOCUMENTS

CN        101742107 A    6/2010
JP        2006-086952 A    3/2006
(Continued)

OTHER PUBLICATIONS

International Search Report mailed in corresponding International Patent Application No. PCT/JP2014/068416 dated Oct. 14, 2014, consisting of 2 pp.
(Continued)

*Primary Examiner* — Luong T Nguyen
(74) *Attorney, Agent, or Firm* — Volpe and Koenig, P.C.

(57) ABSTRACT

A photographing apparatus including: an image pickup device to obtain a picked-up image, the image pickup device being provided with divided pixels for receiving light on respective optical paths from the object divided in left and right directions; a recording medium recording the picked-up image; a display displaying the picked-up image; and a processor comprising a focus judging section judging a state of focus of using a phase difference on an image pickup
(Continued)

surface between image signals based on optical images respectively entering the divided pixels, the focus judging section judges whether or not the phase difference of each area of the picked-up image to be recorded immediately before photographing is equal to or has not increased in comparison with the phase difference of the recorded picked-up image in the same area, to determine a candidate area for an enlarged display.

10 Claims, 15 Drawing Sheets

Related U.S. Application Data continuation of application No. PCT/JP2014/068416, filed on Jul. 10, 2014.

(51) Int. Cl.
*G02B 7/36* (2006.01)
*H04N 5/357* (2011.01)
*G03B 13/24* (2006.01)
*G03B 17/18* (2006.01)

(52) U.S. Cl.
CPC ..... *H04N 5/23219* (2013.01); *H04N 5/23222* (2013.01); *H04N 5/23293* (2013.01); *H04N 5/357* (2013.01); *G03B 17/18* (2013.01)

(58) Field of Classification Search
CPC . G02B 7/36; G02B 7/28; G03B 13/24; G03B 17/18
See application file for complete search history.

(56) References Cited

U.S. PATENT DOCUMENTS

| | | | |
|---|---|---|---|
| 8,717,477 B2 | 5/2014 | Oogami | |
| 9,036,073 B2* | 5/2015 | Yoshida | H04N 5/23212 |
| | | | 348/345 |
| 9,137,506 B2 | 9/2015 | Kim | |
| 9,756,235 B2* | 9/2017 | Kindaichi | H04N 5/23212 |
| 10,021,307 B2* | 7/2018 | Hasegawa | H04N 5/23287 |
| 2006/0072915 A1 | 4/2006 | Onozawa | |
| 2007/0216787 A1 | 9/2007 | Lin | |
| 2007/0230937 A1* | 10/2007 | Ide | G02B 7/36 |
| | | | 396/125 |
| 2007/0286589 A1 | 12/2007 | Ishiwata | |
| 2010/0149402 A1 | 6/2010 | Aoki | |
| 2011/0109771 A1* | 5/2011 | Onomura | G03B 13/10 |
| | | | 348/240.3 |
| 2012/0092545 A1 | 4/2012 | Sugawara | |
| 2012/0133813 A1 | 5/2012 | Nagano | |
| 2012/0274825 A1 | 11/2012 | Oogami | |
| 2013/0135494 A1 | 5/2013 | Kim | |
| 2013/0250162 A1 | 9/2013 | Sasaki | |

FOREIGN PATENT DOCUMENTS

| | | |
|---|---|---|
| JP | 2007-235869 | 9/2007 |
| JP | 2008-004996 | 1/2008 |
| JP | 2008-092299 | 4/2008 |
| JP | 2011-124806 | 6/2011 |
| WO | 2008-041158 A2 | 4/2008 |
| WO | 2013-061947 A1 | 5/2013 |

OTHER PUBLICATIONS

Office Action issued in corresponding Japanese Patent Application No. 2013-192252 dated Jan. 6, 2015, consisting of 7 pp. (English translation provided).

Office Action mailed in corresponding Japanese Patent Application No. 2015-088248 dated Jan. 26, 2016, consisting of 2 pp.

Extended European Search Report mailed in corresponding European Patent Application No. 14815210.1 dated Mar. 3, 2016, consisting of 9 pp.

Office Action mailed in corresponding Chinese Patent Application No. 201480001865.8 dated Sep. 2, 2016, consisting of 7 pp.

* cited by examiner

FAR　　　　IMMEDIATELY BEFORE PHOTOGRAPHING　　　　NEAR

FIG. 16

| TARGET OBJECT | BRIGHTNESS | REFERENCE CONTRAST | REFERENCE CONTOUR WIDTH |
|---|---|---|---|
| HUMAN EYES | OUTDOORS | Cont1 | Ha1 |
| | INDOORS | Cont2 | Ha2 |
| CHARACTERS | OUTDOORS | Cont3 | |
| | INDOORS | Cont4 | |
| ⋮ | ⋮ | ⋮ | ⋮ |
| PRESENT STATE NEWLY SET 1 (PATTERN JUDGMENT) | | ContX | HaX |
| PRESENT STATE NEWLY SET 2 (PATTERN JUDGMENT) | | ContY | Hay |

PHOTOGRAPHING APPARATUS, PHOTOGRAPHING METHOD AND RECORDING MEDIUM ON WHICH PHOTOGRAPHING/DISPLAY PROGRAM IS RECORDED

CROSS REFERENCE TO RELATED APPLICATION

This application is a continuation of U.S. patent application Ser. No. 14/589,529 filed on Jan. 5, 2015, which is a continuation of International Patent Appln. No. PCT/JP2014/068416 filed on Jul. 10, 2014 and claims benefit of Japanese Application No. 2013-192252 filed in Japan on Sep. 17, 2013, the entire contents of which are incorporated herein by this reference.

BACKGROUND OF THE INVENTION

1. Field of the Invention

The present invention relates to a photographing apparatus, a photographing method and a recording medium on which photographing/display program is recorded preferable for things capable of auto-focusing by a contrast method.

2. Description of the Related Art

Recently, portable apparatuses equipped with a photographing function (a photographing apparatus), such as a digital camera, have been widespread. Some of photographing apparatuses of this kind are provided with a display section and equipped with a function of displaying a photographed image. Some others display a menu screen on the display section to facilitate an operation of the photographing apparatus.

Such a display section is often provided on a back of a portable apparatus body, and a user can perform a photographing operation while checking a through image displayed on the display section on the back. Some of the photographing apparatuses of this kind are equipped with a REC view function for checking a recorded image. The REC view function is for displaying an image picked up and recorded for a predetermined time period immediately after image pickup. The user can check a photographing state by a REC view displayed on the display section.

However, since a size of the display section provided on a portable apparatus is relatively small, and a size of a displayed image is also small, it is not easy to check details of a picked-up image by a REC view. Therefore, even if such photographing that is not intended by the user is performed, such as a case where a picked-up image is out of focus, it may not be possible to easily check by a REC view.

Therefore, a technique of judging whether a photographed image is a failed image or not by an image judging section and enlargedly displaying a partial area of the failed image is disclosed in Japanese Patent Application Laid-Open Publication No. 2008-92299.

SUMMARY OF THE INVENTION

A photographing apparatus according to the present invention includes: an image pickup section picking up an image of an object to obtain a picked-up image; a display section displaying the picked-up image; a reference contrast judging section acquiring, for each of parts of a first picked-up image obtained by the image pickup section performing image pickup at a first timing, a reference contrast to be used for focus/unfocused judgment; a recorded-image contrast judging section determining a contrast of each of parts of a second picked-up image obtained by the image pickup section performing image pickup for recording at a second timing later than the first timing; a focus judging section judging, for each of the parts, a state of focus of the second picked-up image by comparing the reference contrast acquired by the reference contrast judging section and the contrast determined by the recorded-image contrast judging section; and a display control section displaying a judgment result by the focus judging section together with the second picked-up image on the display section.

A photographing method according to the present invention includes: an image pickup step of picking up an image of an object to obtain a picked-up image; a first display control step of displaying the picked-up image on a display section; a reference contrast judging step of acquiring, for each of parts of a first picked-up image obtained by the image pickup section performing image pickup at a first timing, a reference contrast to be used for focused/unfocused judgment; a recorded-image contrast judging step of determining a contrast of each of parts of a second picked-up image obtained by the image pickup section performing image pickup for recording at a second timing later than the first timing; a focus judging step of judging, for each of the parts, a state of focus of the second picked-up image by comparing the reference contrast acquired at the reference contrast judging step and the contrast determined at the recorded-image contrast judging step; and a second display control step of displaying a judgment result at the focus judging step together with the second picked-up image, on the display section.

A photographing apparatus according to the present invention includes: an image pickup section picking up an image of an object to obtain a picked-up image, the image pickup section being provided with pixels for image pickup and pixels for focus detection; a display section displaying the picked-up image; a reference phase difference judging section acquiring, for each of parts of a first picked-up image obtained by the image pickup section performing image pickup at a first timing, a reference phase difference to be used for focused/unfocused judgment, on a basis of output of the pixels for focus detection; a recorded-image phase difference judging section determining, for each of parts of a second picked-up image obtained by the image pickup section performing image pickup for recording at a second timing later than the first timing, a phase difference based on the output of pixels for focus detection; a focus judging section judging, for each of the parts, a state of focus of the second picked-up image by comparing the reference phase difference acquired by the reference phase difference judging section and the phase difference determined by the recorded-image phase difference judging section; and a display control section displaying a judgment result by the focus judging section together with the second picked-up image, on the display section.

A photographing method according to the present invention includes: an image pickup step of picking up an image of an object to obtain a picked-up image, wherein pixels for image pickup and pixels for focus detection are provided; a first display control step of displaying the picked-up image on a display section; a reference phase difference judging step of acquiring, for each of parts of a first picked-up image obtained by the image pickup section performing image pickup at a first timing, a reference phase difference to be used for focused/unfocused judgment, on a basis of output of the pixels for focus detection; a recorded-image phase difference judging step of determining, for each of parts of a second picked-up image obtained by the image pickup section performing image pickup for recording at a second timing later than the first timing, a phase difference based on the output of pixels for focus detection; a focus judging step of judging, for each of the parts, a state of focus of the second picked-up image by comparing the reference phase difference acquired at the reference phase difference judging step and the phase difference determined at the recorded-image phase difference judging step; and a second display control step of displaying a judgment result at the focus judging step together with the second picked-up image, on the display section.

A non-transitory computer readable recording medium on which a photographing/display program is recorded, the photographing/display program causing a computer to execute: a first display control step of an image pickup section provided with pixels for image pickup and pixels for focus detection displaying a picked-up image obtained by picking up an image of an object on a display section; a reference phase difference judging step of acquiring, for each of parts of a first picked-up image obtained by the image pickup section performing image pickup at a first timing, a reference phase difference to be used for focused/unfocused judgment, on a basis of output of the pixels for focus detection; a recorded-image phase difference judging step of determining, for each of parts of a second picked-up image obtained by the image pickup section performing image pickup for recording at a second timing later than the first timing, a phase difference based on the output of pixels for focus detection; a focus judging step of judging, for each of the parts, a state of focus of the second picked-up image by comparing the reference phase difference acquired at the reference phase difference judging step and the phase difference determined at the recorded-image phase difference judging step; and a second display control step of displaying a judgment result at the focus judging step together with the second picked-up image, on the display section.

BRIEF DESCRIPTION OF THE DRAWINGS

FIG. 16 is an explanatory diagram for explaining contents of a focus database adopted in the present embodiment.

DETAILED DESCRIPTION OF THE PREFERRED EMBODIMENTS

Embodiments of the present invention will be explained in detail below with reference to drawings.

First Embodiment

Figure 1:
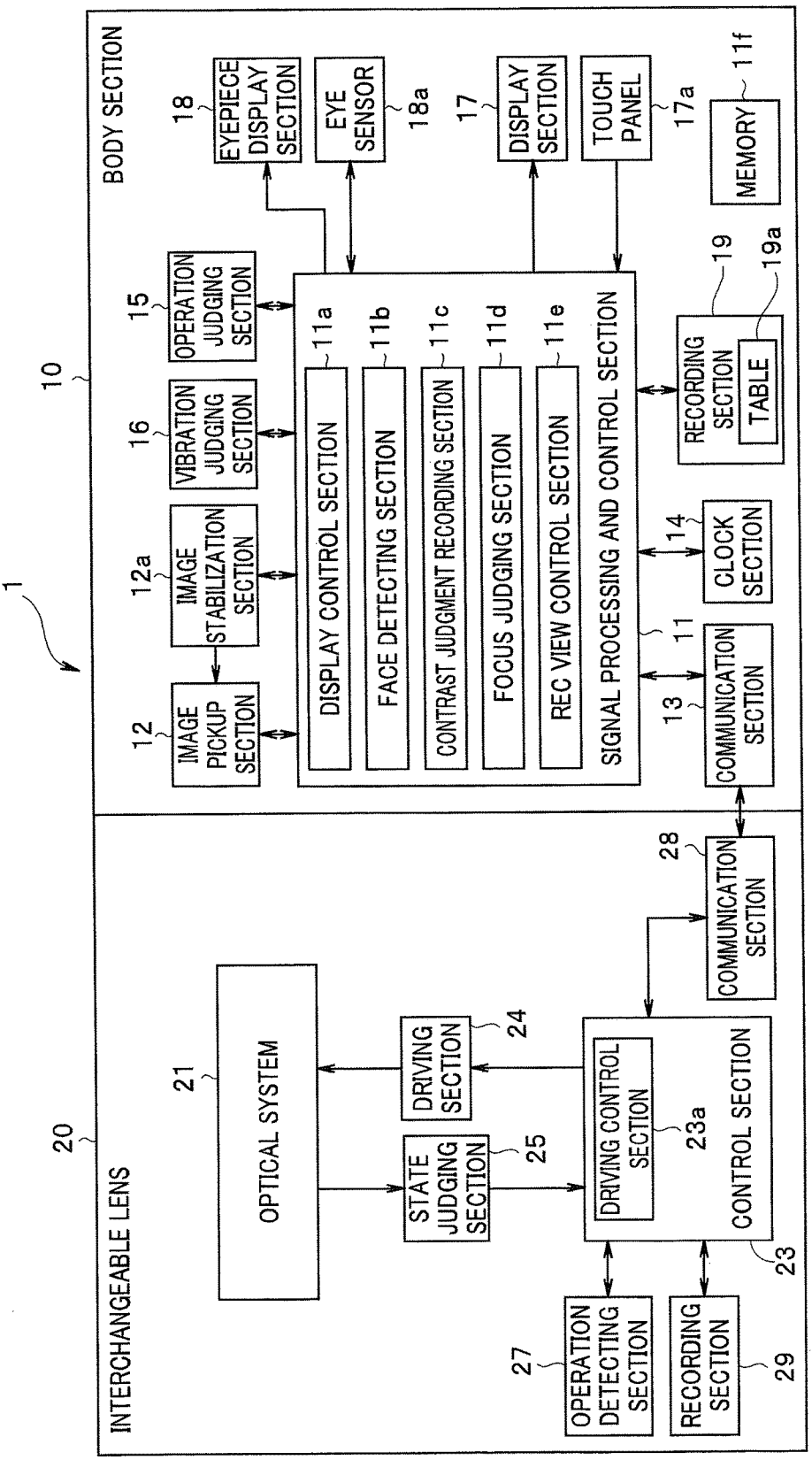
FIG. 1 is a block diagram showing a photographing apparatus according to a first embodiment of the present invention.

FIG. 1 is a block diagram showing a photographing apparatus according to a first embodiment of the present invention. The present embodiment is for determining, for each part of a picked-up image, a contrast used for focused/unfocused judgment (hereinafter referred to as a reference contrast), judging a state of focus by comparing a contrast of each part of the picked-up image to be recorded and the reference contrast, and displaying a judgment result. For example, by causing a contrast of each part of an image at a time of being focused immediately before recording to be the reference contrast and detecting change between the reference contrast and each part of the image to be recorded, it becomes possible to display a guide display showing an image part which is focused.

Figure 2:
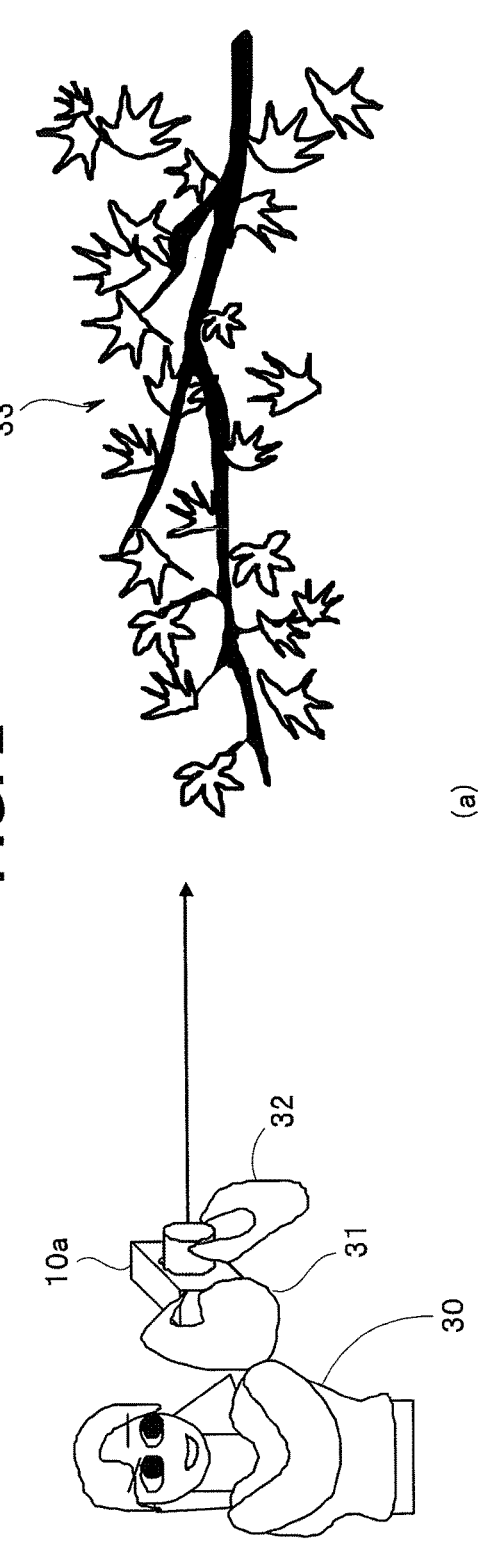
FIG. 2 is an explanatory diagram for explaining a focused part and an unfocused part in a photographed image.
Figure 2:
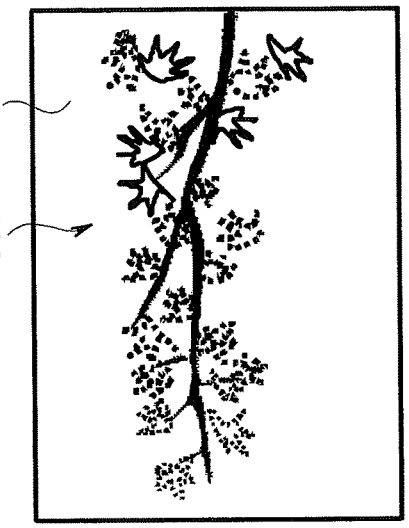
Figure 2:
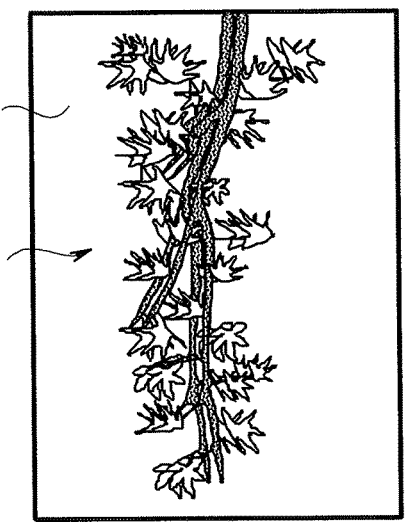
Figure 2:
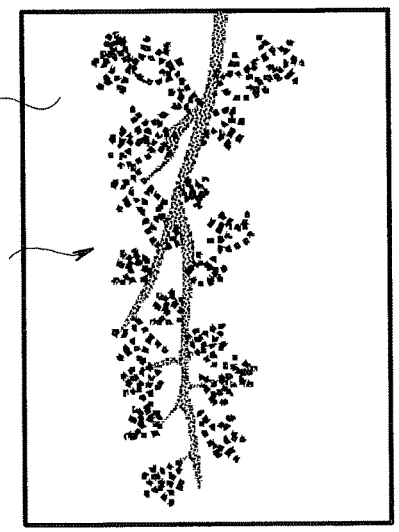
Figure 3:
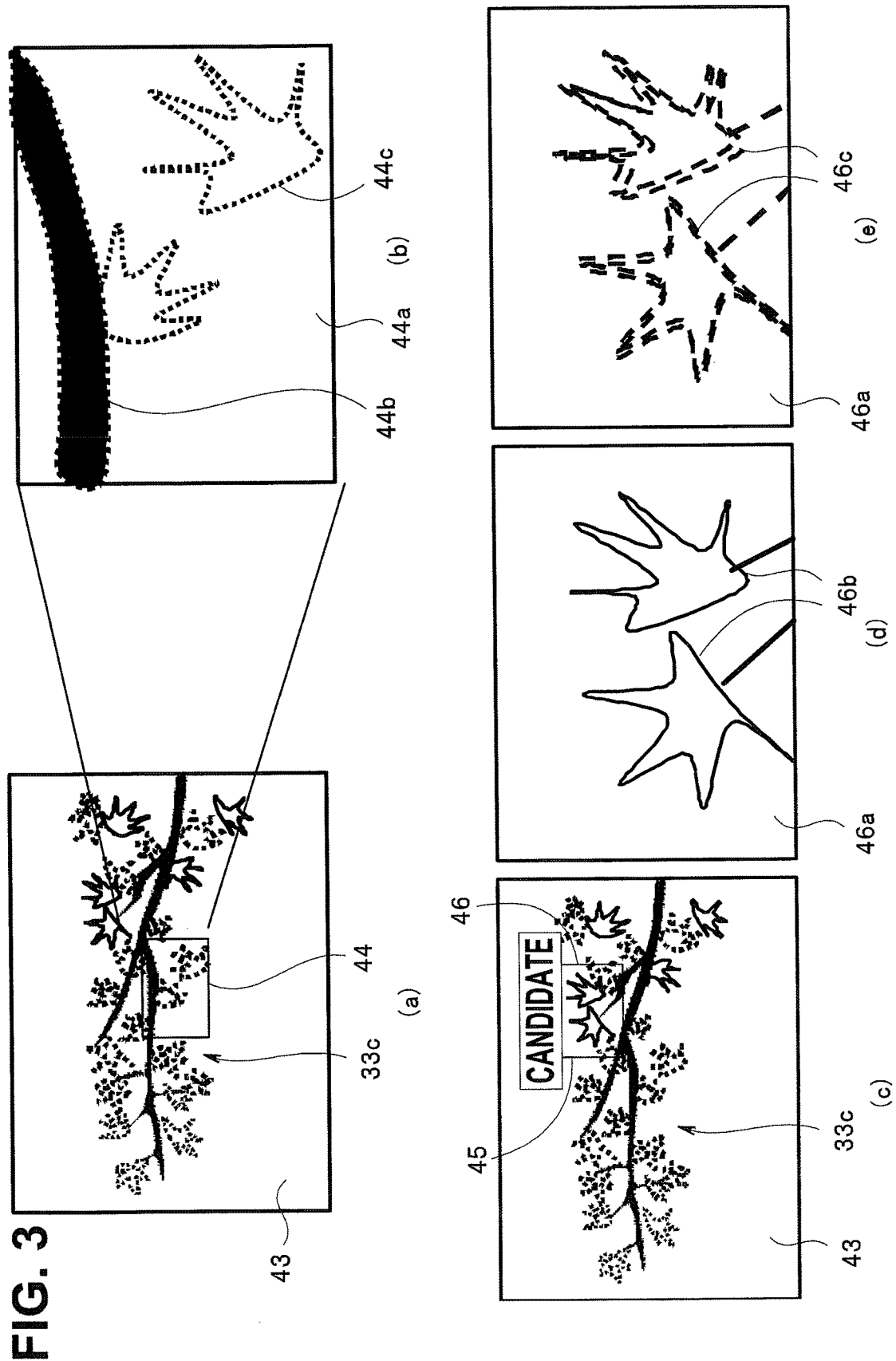
FIG. 3 is an explanatory diagram for explaining a guide display in the present embodiment.

FIG. 2 is an explanatory diagram for explaining a focused part and an unfocused part in a photographed image, and FIG. 3 is an explanatory diagram for explaining the guide display in the present embodiment.

FIG. 2(a) shows a state of a user 30 photographing a branch 33 of a tree. The user 30 holds a case 10a of a camera with a right hand 31 and a left hand 32, and presses down a shutter button (not shown) in a state that the branch 33 is within a photographing range. FIGS. 2(b) to 2(d) show examples of picked-up images 41 to 43 which are REC-view-displayed in this case.

The picked-up image 41 shown in FIG. 2(b) shows that, for example, because of failing in a focusing operation, all parts of an image 33a of the branch 33, which is an object, are unfocused. The picked-up image 42 shown in FIG. 2(c) shows that, though the image seems to be focused when seen as a REC view image at a glance, an image 33b of the branch 33 shows that a blur has occurred for a reason that the branch 33 shook. The image 43 shown in FIG. 2(d) shows that a partial area of an image 33c of the branch 33 is focused, and the other areas are unfocused.

Since a REC view display is displayed on a relatively small display screen provided on a photographing apparatus, it is not easy to check a focused part and an unfocused part. Even in this case, it is relatively easy to perform checking on a REC view display when all parts of an image are unfocused or blurred as in FIGS. 2(b) and 2(c). However, when unfocused parts and focused parts mixedly exist as in FIG. 2(d), it is not easy to check a picked-up image. That is, the user is required to enlargedly display each part of the picked-up image one by one to check a state of focus, and a long time period is required for the checking work.

The picked-up images in FIGS. 2(b) and 2(c) are clearly failed images, and it is difficult to use the picked-up images for a next photographing operation. However, since a part of the picked-up image in FIG. 2(d) is a focused part or a clear part, effective information for a next photographing operation may be obtained by checking the focused part or the like. Otherwise, there is a possibility that the picked-up image in FIG. 2(d) is in a focused state intended by the user.

Therefore, in the present embodiment, it is judged whether a picked-up image in a focused state intended by the user has been obtained or not by detecting a change between contrasts of parts of the image before and after recording, and an area from which effective information for a next photographing operation can be obtained is identified to present the information to the user by a guide display.

FIG. 3(a) shows the same image 43 by the REC view display as in FIG. 2(d). Here, it is assumed that the user specifies enlargement of an appropriate area while looking at the REC view display to check the image. An area 44 in FIG. 3(a) is an area which the user assumes to be focused from the REC view display, an area which the user attempts to cause to be focused at a time of photographing, or an area at a center of a screen.

FIG. 3(b) shows an image 44a obtained by enlargedly displaying the partial area 44 of the picked-up image in FIG. 3(a) on the whole screen. The image 44a includes an enlarged image 44b of a part of the branch 33, an enlarged image 44c of a part of a leaf, and the like. An example of FIG. 3(b) shows that these images 44b and 44c are not focused, and the area 44 is an unfocused area. The user cannot obtain effective information for a next photographing operation only by looking at the enlarged images in the area 44. That is, the effective information for a next photographing operation cannot be obtained only by enlarging a central area set in advance or an area the user randomly specifies, and the user is required to check a state of each part on the screen while sliding the enlarged areas one by one in order to obtain the effective information.

In comparison, in the present embodiment, it is possible to easily grasp a state of photographing this time and display a guide display for specifying a candidate for an area from which the effective information for a next photographing operation can be obtained. FIG. 3(c) shows an example of the guide display in the present embodiment. A partial area 45 in the picked-up image 43 of FIG. 3(a) is a focused part, and at which position in the picked-up image 43 the focused part exists can be shown by the guide display. In FIG. 3(c), the focused part is shown by a guide display 46 formed by a rectangular frame with "candidate" displayed nearby. The guide display 46 shows an optimal area as a candidate for an area to be enlarged.

FIG. 3(d) shows an enlarged image 46a obtained by enlarging the part of the guide display 46. An image part 46b of leaves which is focused is included in the enlarged image 46a. By referring to the enlarged image 46a, the user can easily check that the area 45 is focused. Further, by the guide display 46 in FIG. 3(c), the user can grasp whether a focus is displaced in a depth direction or to a front side relative to a position the user assumes to be focused.

FIG. 3(e) shows another example of the enlarged image 46a obtained by enlarging the part of the guide display 46 in FIG. 3(d). The enlarged image 46a in FIG. 3(e) includes an image part 46c of leaves which is blurred. That is, an example of FIG. 3(e) shows that an image part in the area 45 is blurred. Thus, by enlarging the area 45 specified by the guide display 46, it is possible to obtain more detailed information about focus displacement or blur.

In FIG. 1, a photographing apparatus 1 in the present embodiment is configured with a body section 10 and an interchangeable lens 20. A main circuit part of the photographing apparatus 1 is housed in the body section 10, and the interchangeable lens 20 is detachably attached to a front of the body section 10.

The interchangeable lens 20 has an optical system 21 which leads an object image to an image pickup section 12 of the body section 10. The optical system 21 is configured by a plurality of lenses not shown being arranged on an optical axis from an object side to an image pickup surface (an image surface) of the image pickup section 12. That is, the optical system 21 internally has a focus lens which can be moved to set a state of focus by focusing and a zoom lens for changing magnification in the focused state. The optical system 21 also has a mechanism section not shown, which is for driving these lenses and a diaphragm.

A driving section 24 controls the mechanism section of the optical system 21 to perform driving control of the focus lens, the zoom lens and the diaphragm. Note that the diaphragm is arranged, for example, between predetermined lenses of the optical system 21.

The interchangeable lens 20 is provided with an operation section not shown, such as an operation ring, for an operation by the user for setting parameters relating to photographing, for example, parameters relating to focus, zoom and the diaphragm, and an operation detecting section 27 is adapted to detect a user operation on the operation section and output a detection result to a control section 23. The control section 23 is configured with a microcomputer or the like and controls each section of the interchangeable lens 20 on a basis of the detection result of the operation detecting section 27 and a signal from a signal processing and control section 11 of the body section 10 to be described later.

A driving control section 23a of the control section 23 generates various kinds of control signals in accordance with the detection result of the operation detecting section 27 and control by the signal processing and control section 11. For example, the driving control section 23a generates a focus signal, a zoom signal and a diaphragm control signal to control the driving section 24. The driving section 24 performs driving control of the focus lens on a basis of the focus signal, performs driving control of the zoom lens on a basis of the zoom signal and performs driving control of the diaphragm on a basis of the diaphragm control signal.

A state judging section 25 judges lens positions of the zoom lens and the focus lens to output a signal showing a lens state to the control section 23, and judges an aperture amount of the diaphragm to output a signal showing a diaphragm state to the control section 23. Using a result of the judgment of the point of focus, the zoom position, and the aperture amount of the diaphragm, the control section 23 controls the driving section 24 so that a point of focus, a zoom position and an aperture amount of the diaphragm corresponding to the detection result of the operation detecting section 27 and the control signal from the signal processing and control section 11 can be obtained.

The interchangeable lens 20 is provided with a communication section 28. The body section 10 is provided with a communication section 13. The communication section 28 performs transmission and reception of information with the communication section 13 of the body section 10 via a predetermined transmission line. When communication with the communication section 13 of the body section 10 is established, the control section 23 can cause lens-specific information, information about a zoom operation, and information about a point of focus, a diaphragm state and the like, which are stored in a recording section. 29, to be transmitted to the body section 10 by the communication sections 28 and 13 as lens information.

The body section 10 can recognize which zoom functions the interchangeable lens 20 has, and a focal distance range (magnification), focal distance, shortest focal distance, infinite long distance, brightness number, etc. of the zoom lens by the lens information. The control section 23 is adapted to transmit information about the detection result of the operation detecting section 27 also to the body section 10.

The body section 10 constituting the photographing apparatus 1 has the image pickup section 12 configured with an image pickup device such as a CCD or CMOS sensor. The image pickup section 12 performs photoelectric conversion of an object image from the interchangeable lens 20 provided on the front of the body section 10 to obtain a photographed image. The image pickup section 12 is driving-controlled by the signal processing and control section 11 to output a picked-up image.

The signal processing and control section 11 is configured, for example, with a CPU and controls each section of the photographing apparatus 1. The signal processing and control section 11 outputs an image pickup device driving signal to the image pickup section 12 and reads out a picked-up image from the image pickup section 12. The signal processing and control section 11 performs predetermined signal processing, for example, color adjustment processing, matrix conversion processing and noise removal processing, and other various kinds of signal processing on the read-out picked-up image.

A clock section 14 and an operation judging section 15 are also arranged on the body section 10. The clock section 14 generates time information to be used by the signal processing and control section 11. The operation judging section 15 is adapted to generate an operation signal based on a user operation on the operation section provided on the body section 10, which includes a release button, a function button, various kinds of switches for setting a photographed mode and the like, which are not shown, and output the operation signal to the signal processing and control section 11. The signal processing and control section 11 controls each section on a basis of the operation signal.

The signal processing and control section 11 can perform processing relating to recording and reproduction of a picked-up image. For example, the signal processing and control section 11 can perform compression processing of a photographed image which has been signal-processed and give the compressed image to a recording section 19 to cause the recording section 19 to record the image. For example, a card interface can be adopted as the recording section 19, and the recording section 19 can record image information, voice information and the like to a recording medium such as a memory card. In the present embodiment, a table 19a in which a contrast of each image part is described is recorded in the recording section 19 as described later.

A display control section 11a of the signal processing and control section 11 executes various kinds of processing relating to display. The display control section 11a can give a photographed image which has been signal-processed to a display section 17 and an eyepiece display section 18. Each of the display section 17 and the eyepiece display section 18 has a display screen such as an LCD and displays the image given from the display control section 11a. The display control section 11a is also adapted to be able to cause various kinds of menu displays and the like to be displayed on display screens of the display section 17 and the eyepiece display section 18.

The body section 10 is provided with an eye sensor 18a which detects that the user has brought his/her eye near to the eyepiece display section 18. The signal processing and control section 11 is adapted to be able to judge whether or not the user has brought his/her eyes near to the eyepiece display section 18 by a detection result of the eye sensor 18a.

The signal processing and control section 11 can read out a picked-up image recorded in the recording section 19 and perform expansion processing thereof. The display control section 11a can reproduce the recorded image by giving the picked-up image which has been expansion-processed to the display section 17 or the eyepiece display section 18.

The display section 17 has a display screen 17b for displaying a picked-up image as described later. A touch panel 17a is provided on the display screen 17b. The touch panel 17a can generate an operation signal corresponding to a position on the display screen 17b the user points at with his/her finger. The operation signal is provided to the signal processing and control section 11. Thereby, when the user touches or slides his/her finger on the display screen 17b, the signal processing and control section 11 is adapted to be able to detect various operations, such as a position the user touches, an operation of bringing fingers close to each other and then separating the fingers (a pinching operation), a slide operation and a position reached by the slide operation, a slide direction and a period of touching, and can execute processing corresponding to a user operation.

Note that the display section 17 is arranged, for example, such that it occupies a substantially whole area of a back of the body section 10, and a photographer can check a through image displayed on the display screen 17b of the display section 17 at the time of photographing, and can also perform a photographing operation while checking the through image.

The body section 10 is provided with a vibration judging section 16. The vibration judging section 16 is configured with a gyro sensor, an acceleration sensor or the like and is adapted to detect shaking or vibration of a case in which the body section 10 is housed. A judgment result of the vibration judging section 16 is given to the signal processing and control section 11.

The body section 10 is provided with an image stabilization section 12a. The image stabilization section 12a is adapted to, by being controlled by the signal processing and control section 11, control the image pickup section 12 according to a state of a camera shake to cause a picked-up image from which influence of the camera shake has been removed to be outputted from the image pickup section 12.

In the present embodiment, it is possible to make it easy for the user to check a state of focus of a picked-up image and display a guide display so that effective information for a next photographing operation can be obtained, as described above.

In the present embodiment, in order to cause such a guide display to be displayed, the signal processing and control section 11 has a face detecting section 11b, a contrast judgment recording section 11c, a focus judging section 11d and a REC view control section 11e.

The face detecting section 11b performs processing for face detection from a picked-up image in a well-known method for a picked-up image. For example, the face detecting section 11b can detect a person's face by comparing a plurality of shaded images obtained by modeling face brightness characteristics with a photographed image one by one. The face detecting section 11b can detect not only a face of a person but also a whole body of the person. Further, the face detecting section 11b can detect an area of an object, such as a pet or a particular substance, or a part thereof or the like, for example, by pattern judgment.

The contrast judgment recording section 11c determines a contrast of an image to be recorded as well as a reference contrast. The contrast judgment recording section 11c can judge a contrast of each part of a picked-up image while changing a point of focus. For example, the contrast judgment recording section 11c divides a picked-up image into a plurality of areas and judges a contrast of each divided part. The contrast judgment recording section 11c records a table 19a in which the determined contrast of each part is described, to the recording section 19. The contrast judgment recording section 11c judges a point of focus where the contrast is the largest to be a focused position and sets, for example, a contrast at this point of focus as a reference contrast at a time of being focused.

For example, the contrast judgment recording section 11c may record a contrast determined for each part by so-called mountain-climbing type auto-focusing. The contrast judgment recording section 11c may determine a contrast of each part of a picked-up image at each point of focus by manual focusing and record the contrast. Judgment and recording of contrasts by the contrast judgment recording section 11c are performed, for example, immediately before actual photographing. The above phrase "immediately before" intends to mean that it is important that a positional relation between an object and a photographer is not significantly different from that at the time of photographing, and it is not limited to this in a situation of being relatively fixed or in a state in which a depth of focus and a depth of field are deep. It is also possible to compare images to judge that a situation has not changed, and judge whether a recording result is effective or not. If results at a plurality of points of focus are held, reliability as a reference is enhanced.

Note that, in this contrast information, relative change at a time of focusing is important. Between a state of an object having an originally low contrast being completely focused and a state of an object having an originally high contrast not being completely focused, the contrast of the former may be lower. Therefore, correct focusing control is difficult unless it is judged how a contrast changes by focusing as in FIG. 5. Therefore, comparison of the contrast information at the time of focusing is effective for a same object region, but comparison of the contrast information between different objects is meaningless from a viewpoint of judgment of a focus. Thus, it is meaningful to have information about a contrast change at the time of focusing. What contrast has been obtained at which position of an image may be compared, same objects may be compared by image judgment. The more contrast judgments and recorded regions are obtained, the more an amount of information can be increased. However, since a recording capacity and a communication speed are influenced thereby, data may be left only for a particular block or a particular characteristic image (such as a face).

The contrast judgment recording section 11c is adapted to determine a contrast of each part of a picked-up image which has been picked up and is to be actually recorded and cause the recording section 19 to record the contrast.

The focus judging section 11d reads out the contrast of each part of the picked-up image to be recorded, from the recording section 19. The focus judging section 11d reads out information (reference contrasts) in the table 19a recorded in the recording section 19. The focus judging section 11d compares the contrast of each part of the picked-up image to be recorded and a contrast of each part immediately before photographing (immediately before recording) described in the table 19a, for each part of the picked-up image. That is, the focus judging section 11d judges a state of focus for each part of a picked-up image by comparing a contrast before recording and a contrast after recording for each part of the picked-up image. The focus judging section 11d outputs a judgment result to the REC view control section 11e.

For example, the focus judging section 11d checks a contrast for an area assumed to be focused (hereinafter referred to as an assumed-to-be-focused part) such as a position of a main object by face detection, a position at the center of the screen and a position of a nearest object. Note that, at a time of manual focusing, an area specified by the user may be enlargedly displayed in order to support the manual focusing, and, in this case, the area to be partially enlarged may be caused to be the assumed-to-be-focused part. An area specified by the user during a peaking function may be caused to be the assumed-to-be-focused part.

If the contrast in the assumed-to-be-focused part after recording is equal to or larger than that before recording, it is judged that photographing is successful with regard to focusing. In this case, the focus judging section 11d may set the assumed-to-be-focused part as a candidate for an area suitable for being enlargedly displayed (hereinafter referred to as a candidate area for being enlarged).

If, for example, the contrast for the assumed-to-be-focused part is smaller after recording than that before recording, the focus judging section 11d judges whether or not a contrast for any other part than the assumed-to-be-focused part after recording is equal to or larger than that before recording. If any such part exists, the part is judged to be the candidate area for being enlarged. The focus judging section 11d outputs a judgment result to the REC view control section 11e.

By controlling the display control section 11a, the REC view control section 11e performs REC view display for displaying a picked-up image taken in from an image pickup section 2 and image-processed by the signal processing and control section 11 immediately after photographing on a display screen of the eyepiece display section 18 or the back face display section 17 as a REC view image. In the present embodiment, the REC view control section 11e is adapted to be given a judgment result of the focus judging section 11d and display a guide display based on the judgment result on the display screen, the guide display being put on the REC view display.

For example, the REC view control section 11e causes a guide display by a frame indicating a position of a candidate area for being enlarged, to be displayed. The REC view control section 11e may cause characters of "candidate" indicating that a position is a position of a candidate for being enlargedly displayed to be displayed near the frame.

Further, the REC view control section 11e may enlargedly display a candidate area for being enlarged on the whole display screen after a predetermined time period elapses after the user's enlargement operation or the REC view display.

Figure 4:
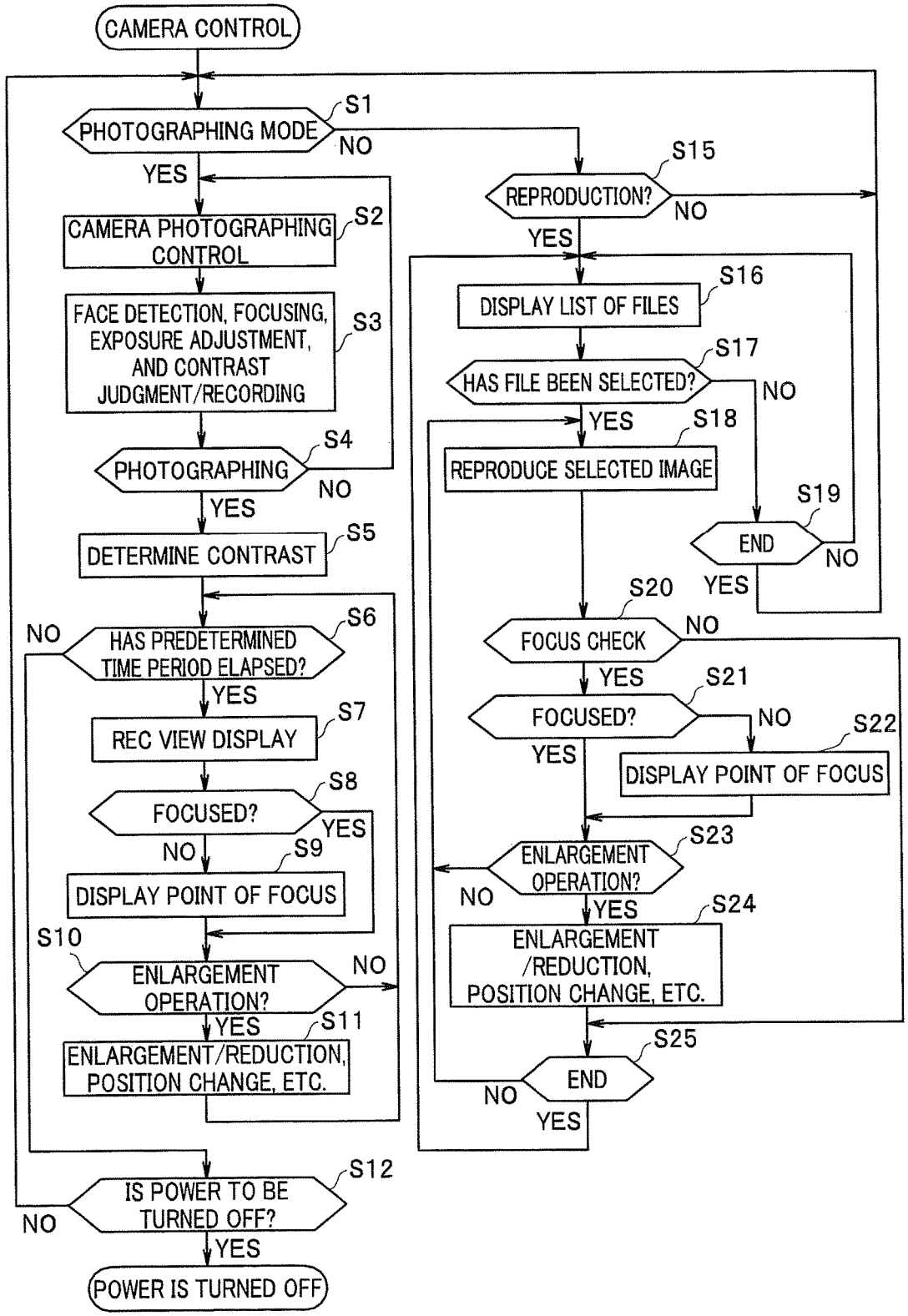
FIG. 4 is a flowchart for explaining camera control.
Figure 5:
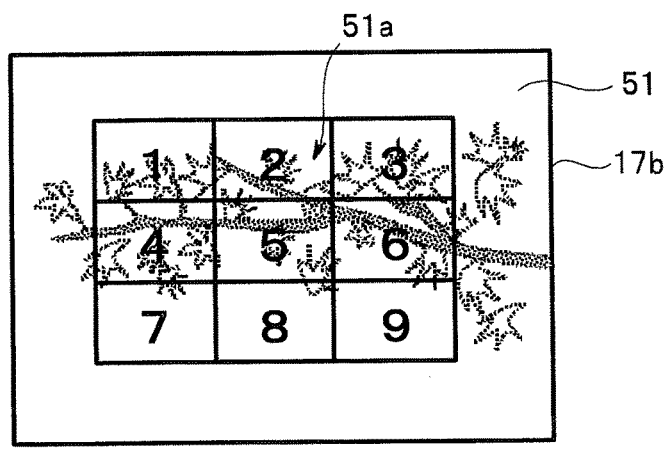
FIG. 5 is an explanatory diagram for explaining focus judgment.
Figure 6:
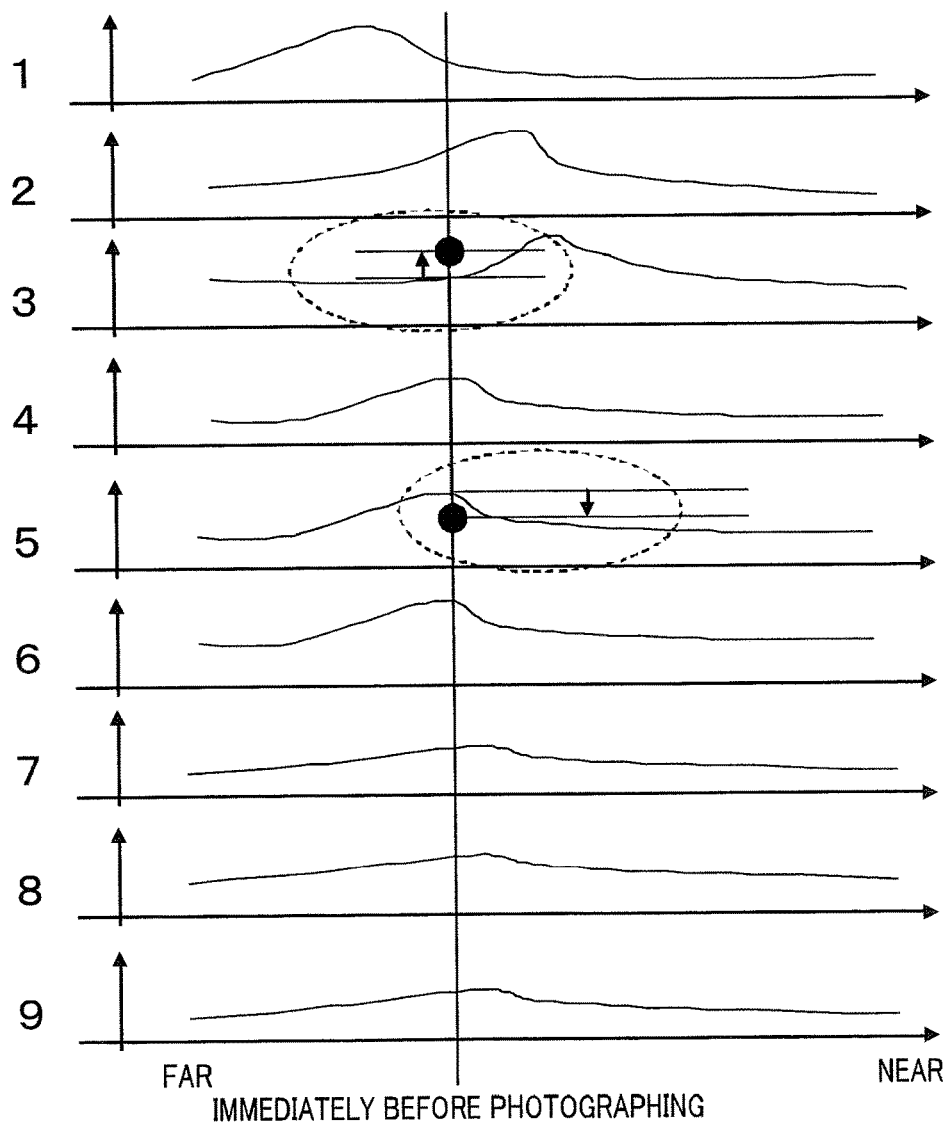
FIG. 6 is an explanatory diagram for explaining the focus judgment.
Figure 7:
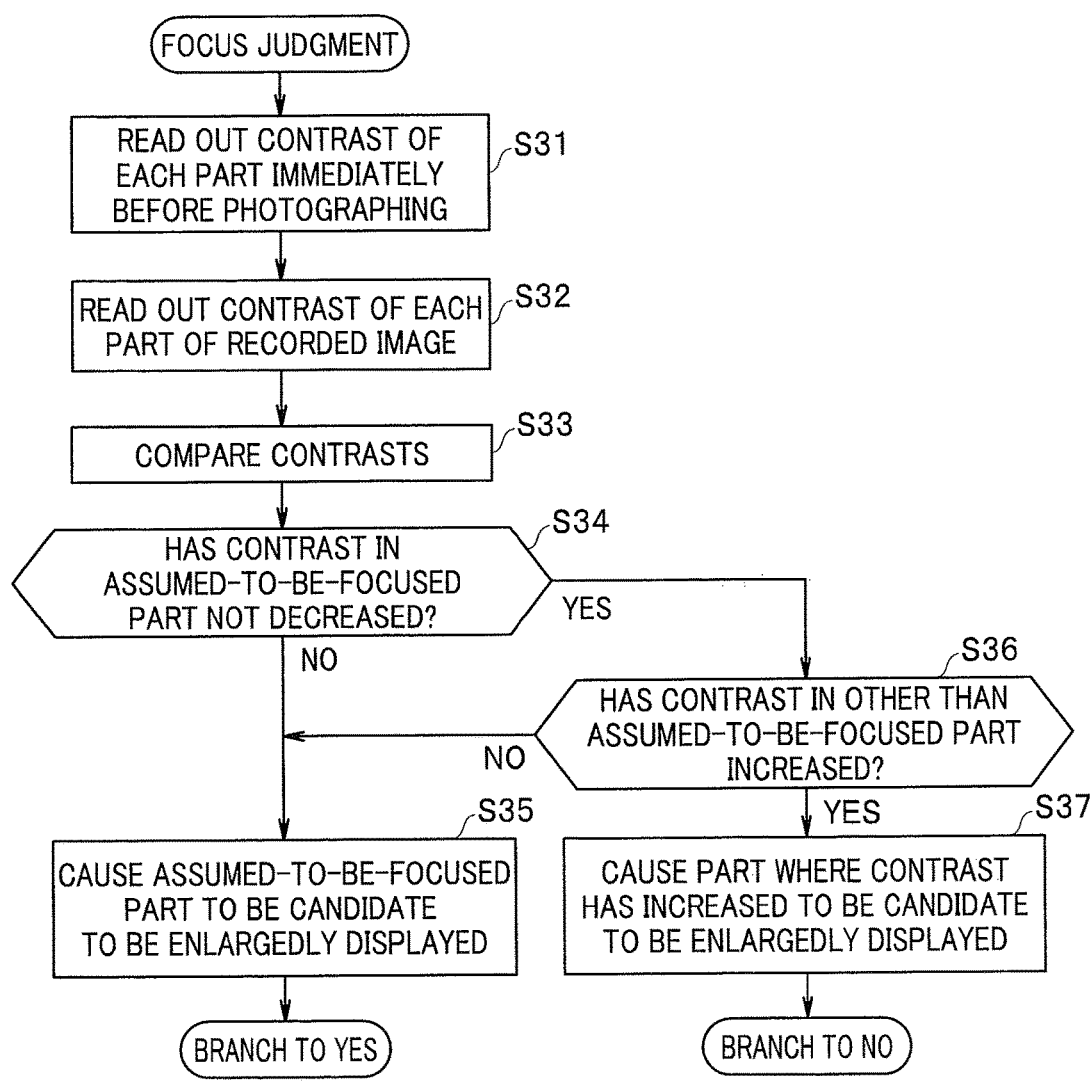
FIG. 7 is a flowchart showing a concrete example of the focus judgment.
Figure 8:
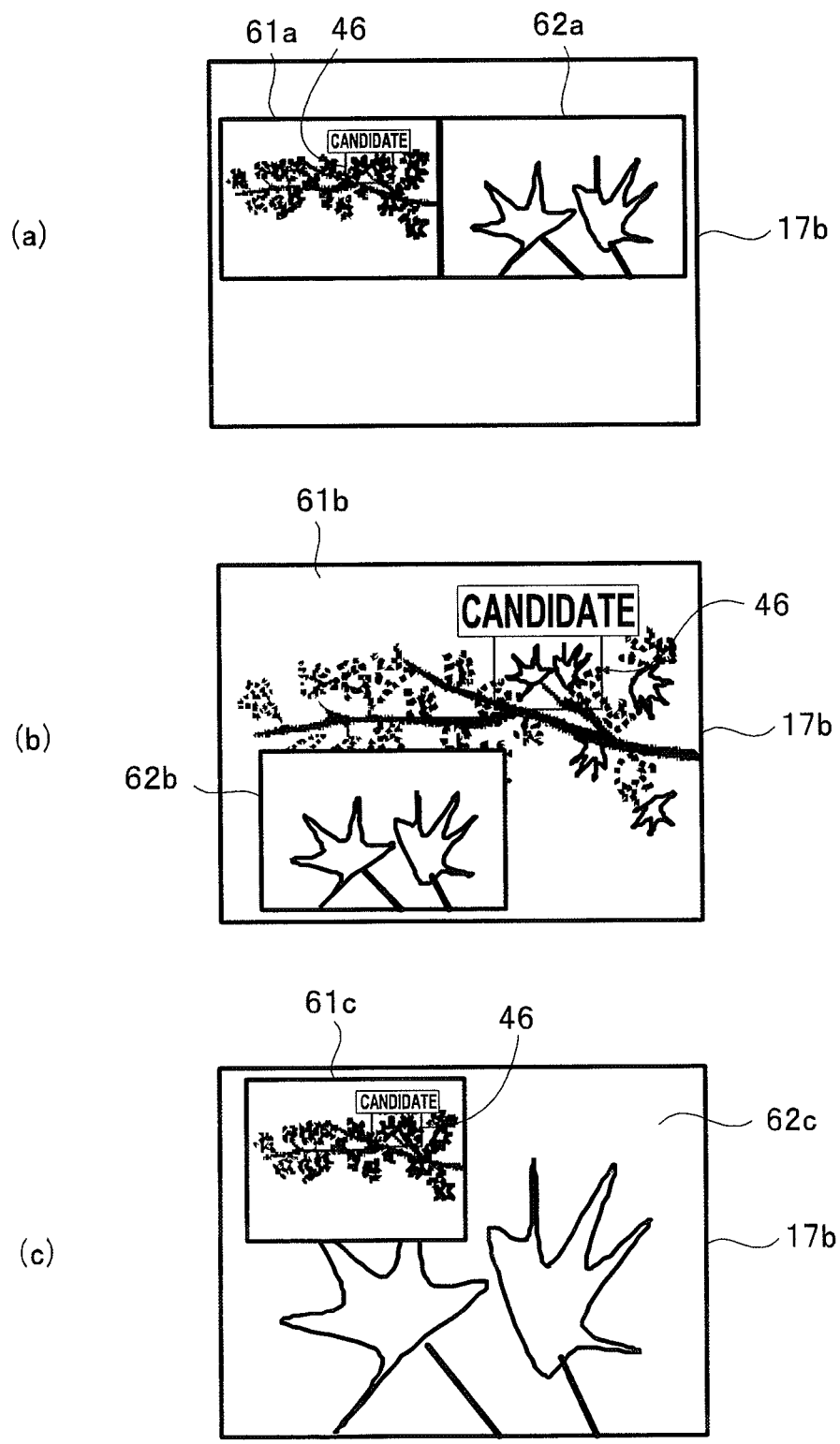
FIG. 8 is an explanatory diagram showing a display example of the guide display.

Next, an operation of the embodiment configured as described above will be explained with reference to FIGS. 4 to 8. FIG. 4 is a flowchart for explaining camera control, and FIGS. 5 and 6 are explanatory diagrams for explaining focus judgment. FIG. 7 is a flowchart showing a concrete example of the focus judgment, and FIG. 8 is an explanatory diagram showing a display example of the guide display.

When the photographing apparatus 1 is powered on, the signal processing and control section 11 judges whether a photographing mode has been specified or not at step S1 in FIG. 4. When the photographing mode is specified, the signal processing and control section 11 performs camera photographing control at step S2. Thereby, the signal processing and control section 11 acquires an image signal from the image pickup section 12 and performs live view display of a picked-up image (a through image) on the display section 17. At step S3, the signal processing and control section 11 performs face detection processing, focusing processing, contrast judgment processing, contrast recording processing and the like.

That is, the face detecting section 11b detects a face in the picked-up image and outputs a detection result to the contrast judgment recording section 11c. The signal processing and control section 11 performs focusing processing (auto-focus processing) while pursuing an object in accordance with a result of detection of the object or performs the auto-focus processing so that a position set in advance, for example, a position at the center of the screen is focused.

The contrast judgment recording section 11c records a contrast at each lens position determined by the focusing processing, for example, mountain-climbing-type auto-focus processing, for each part of the picked-up image. That is, the contrast judgment recording section 11c judges not only an assumed-to-be-focused part but also the contrast in each part of the picked-up image. A table 19a including the contrast of each part of the picked-up image at each lens position is created and recorded into the recording section 19. Here, it is to be noticed that, as for the contrast information, it is important to compare a result of judgment how a contrast changes by focusing and a contrast of a same object region after photographing. Comparison of the contrast information at the time of focusing is effective for a same object region, but comparison of the contrast information between different objects is meaningless from a viewpoint of judgment of a focus. Therefore, it is necessary to perform comparison for a same object region (such as a face). Strictly speaking, even in a case of a same face, a way of a light beam illuminating the face changes depending on a motion, and a contrast change due to a strict focus change may occur. In such a case, a degree of correspondence between images is judged by color distribution or light and shade distribution, and contrast comparison may be enabled only when an extreme change is not seen. That is, a reference contrast for judging whether an object is focused or not differs according to a situation, an object and the like at that time. In order to solve such a problem, same regions in the screen before and after photographing are compared, or images before and after photographing are compared to cause same shapes or things of a same color to be targeted by comparison. In a same way of thinking, it is attempted to judge an object which is focused rather better at the time of photographing than before photographing. If results at a plurality of points of focus are held before photographing, reliability as a judgment reference is enhanced.

FIG. 5 shows a relationship between a through image 51 displayed on the display screen 17b and contrast judgment areas. FIG. 5 shows that a contrast is judged in nine parts indicated by frames at the center of the screen in which numerals 1 to 9 are arranged. Note that, an image 51a of a branch obtained by picking up an image of the branch 33 in FIG. 2(a) is included in the through image 51 of FIG. 5.

FIG. 6 shows a contrast change in each of the areas denoted by the numerals 1 to 9 (hereinafter referred to as the areas 1 to 9) in FIG. 5, with a horizontal axis indicates a point of focus. Note that the area 5 is an assumed-to-be-focused part. A vertical line in FIG. 6 indicates a point of focus immediately before photographing, and, at this timing, a contrast of the area 5 is highest, and it is seen that the area 5 is in a state of being focused. The contrasts at points of focus of the respective areas 1 to 9 shown in FIG. 6 are recorded into the table 19a.

At step S4, it is judged whether a photographing operation has been performed or not. For example, when still image photographing is specified by a release button operation or the like, the signal processing and control section 11 performs photographing. That is, after performing signal processing of a picked-up image from the image pickup section 12 and compressing the picked-up image, the signal processing and control section 11 gives the picked-up image to the recording section 19 to record it. The contrast judgment recording section 11c also determines a contrast for each image part (object) of the picked-up image photographed and recorded, and records the determined contrast into the recording section 19 (step S5).

Next, while monitoring a REC view display time period at step S6, the signal processing and control section 11 gives the recorded picked-up image to the display section 17 to perform REC view display of the picked-up image (step S7). When a predetermined time period has elapsed after starting the REC view display; the signal processing and control section 11 judges whether a power-off operation has been performed or not, at step S12. The process of steps S1 to S11 is repeated until a power-off operation is performed. When a power-off operation is performed, the signal processing and control section 11 turns off a power source to finish the process.

In the present embodiment, it is possible to present a guide display based on a state of focus in a picked-up image to the user during a REC view display period. That is, the focus judging section 11d judges a state of focus at step S8.

FIG. 7 shows an operation flow in this case. The focus judging section 11d reads out a contrast of each part immediately before photographing from the table 19a at step S31. Next, the focus judging section 11d reads out a contrast of each part recorded in the recording section 19, at step S32. Next, the focus judging section 11d assumes the contrast immediately before photographing as a reference contrast at the time of being focused, and compares the reference contrast and the contrast of the picked-up image to be recorded, for each part (step S33).

The focus judging section 11d judges whether or not a contrast immediately before photographing in an area with a highest contrast immediately before photographing, that is, an assumed-to-be-focused part (a reference contrast) and a contrast of a same area in the picked-up image to be recorded are equal or whether or not the contrast immediately before photographing has not decreased (step S34). If the contrast immediately before photographing is equal to or higher than the contrast of the picked-up image to be recorded, the assumed-to-be-focused part is caused to be a candidate to be enlargedly displayed (step S35). In this case, the focus judging section 11d may judge that photographing is successful.

If the contrast of the same area of the picked-up image to be recorded is larger than the contrast in the area with the highest contrast immediately before photographing, that is, the assumed-to-be-focused part, the signal processing and control section 11 detects a part where the contrast of the picked-up image to be recorded is larger than the contrast immediately before photographing among parts other than the assumed-to-be-focused part (step S36). If such a part does not exist, the process transitions to step S35. If such a part exists, the process transitions to step S37, and the part is caused to be a candidate to be enlargedly displayed.

FIG. 6 shows contrasts in the areas 5 and 3 of a picked-up image to be recorded, with black circles and shows that the contrast has decreased in comparison with that immediately before photographing in the area 5, and the contrast has increased in comparison with that immediately before photographing in the area 3. Therefore, in an example of FIG. 6, the area 3 is set as a candidate for being enlargedly displayed.

The REC view control section 11e is given a judgment result of the focus judging section 11d and displays the guide display 46 (see FIG. 3(c)) showing an area which is focused and which is a candidate for being enlarged, on the display screen (step S9). At step S10, the REC view control section 11e judges whether an enlargement operation by the user has been performed or not. If an enlargement operation has been performed, the REC view control section 11e enlargedly displays the area which is a candidate for being enlargedly displayed (step S11).

As described above, here, a change in each area is checked, and it is judged how a contrast has changed in a same area after photographing, with a contrast change before photographing used as a reference. This method is effective if there is not considerable shaking or a shake of a large object in the screen. However, in a case where a position of an object in the screen changes in comparison before and after photographing, or the like, it is possible to, on an assumption that the object shakes up and down, left and right, judge a contrast change by using contrast data of an adjoining area (block) or by a result of pursuing a same image, rather than judging for each area. Here, the judgment is simplified with use of such an example of division into areas and use of a same area. In addition, it is attempted to judge a contrast change for a same object in comparison before and after photographing by effectively utilizing use of an adjoining area or similar image judgment.

Even for a same area, judgment is performed about a contrast curve before photographing as in FIG. 6, and it is judged that a contrast change corresponding to the curve (detected within the curve) is reliable, but, if the contrast change is too large when compared, a judgment of being focused is not made even if a contrast increases. That is, if results at a plurality of points of focus are held, reliability as a reference is enhanced.

That is, if, in the increase judgment at S36 in FIG. 7, an increase judgment result exceeds a predetermined amount or departs from values detected by the contrast change curve, the flow is caused to branch to No.

The judgment of S36 is not limited to judgment about whether contrasts in areas other than the assumed-to-be-focused part have increased or not by contrast changes in divided areas. It is also possible to perform image recognition or pursuit and, if a contrast of a same object has increased as a result of the pursuit, cause S36 to branch to Yes. That is, the reference contrast described above is a value obtained in accordance with contrast change data obtained at a time of performing focusing control, and it can be utilized by using a value of a same block (area) or an adjoining block (area) or pursuing an object and judging the same object before and after photographing. In a same way of thinking, it is attempted to judge an object which is focused rather better at the time of photographing than before photographing. That is, in the process described above, the reference contrast described above can be said to be determined by using contrasts for a same object before and after photographing, and judgment may be made from an object after photographing by selecting contrast information about the object before photographing.

FIG. 8 shows a display example of a guide display and an enlarged display. FIG. 8(a) shows an example of performing two-screen display of a reduced image 61a of a whole picked-up image and an enlarged image 62a of a candidate area on the display screen 17b. The guide display 46 is displayed in the reduced image 61a. FIG. 8(b) shows an example of performing parent-screen display of the whole picked-up image on the display screen 17b as a parent image 61b and performing child-screen display of an enlarged image 62b in a partial are of the display screen. The guide display 46 is displayed in the parent image 61b. FIG. 8(c) shows an example of performing parent-screen display of an enlarged image 62c on the display screen and performing child-screen display of the whole picked-up image in a partial area of the display screen as a child image 61c. The guide display 46 is displayed in the child image 61c. At step S11, switching among the respective displays in FIG. 8 is possible in accordance with a user operation.

The user can relatively easily grasp whether photographing has failed or is successful by the displays in FIG. 8. Even if photographing has failed, an effective suggestion for a next photographing operation can be obtained by referring to the enlarged display.

If judging that the photographing mode is not specified, at step S1 in FIG. 4, the signal processing and control section 11 judges whether a reproduction mode has been specified or not, at step S15. If the reproduction mode is specified, the signal processing and control section 11 displays a list of thumbnails at step S16. When an image is selected by the user who has referred to the list of thumbnails, the process transitions from step S17 to S18, and the signal processing and control section 11 reproduces the selected image. Note that, when judging that the reproduction has ended, at step S25, the signal processing and control section 11 repeats display of the list of files (step S16). If a file is not selected, it is judged that the reproduction mode is to be ended, at step S19.

In the present embodiment, it is possible to check a state of focus even at a time of reproduction. At step S20, the signal processing and control section 11 judges whether an operation for checking the state of focus has been performed or not. If this operation is not performed, the process transitions to step S25, and it is judged that the reproduction mode is to be ended. When the operation for checking the state of focus is performed, a process similar to steps S8 to S11 is performed at steps S21 to S24. That is, a guide display and an enlarged display of a candidate area are displayed even at the time of reproduction.

As described above, in the present embodiment, a state of focus is judged by comparing a contrast of each part of a picked-up image immediately before recording and a contrast of each part of the picked-up image after recording, and a judgment result is presented to a user. Thereby, it is possible to check at a glance whether a picked-up image in which a part caused to be focused is focused has been obtained or not. Further, it is possible to easily check where a focused part other than the part caused to be focused exists and easily check an enlarged image of the part, and it is possible to easily obtain an effective suggestion for a next photographing operation by analyzing photographing himself/herself.

Modification

Figure 9:
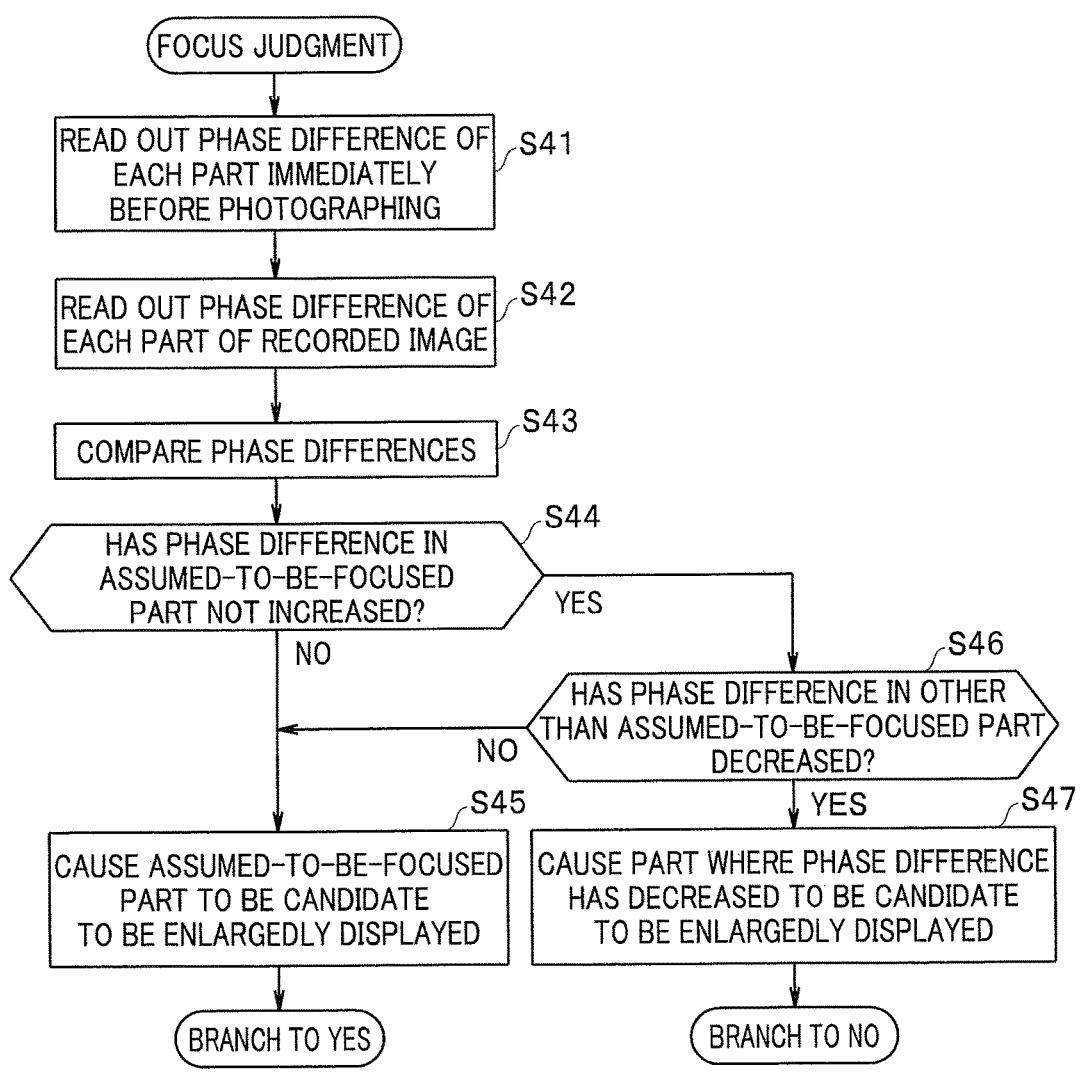
FIG. 9 is a flowchart showing a modification of a focus state judgment method.

FIG. 9 is a flowchart showing a modification of the focus state judgment method, which can be adopted instead of FIG. 7. In an example of FIG. 9, focus control by an image surface phase difference method is used instead of the mountain-climbing type. That is, the present modification is for determining a phase difference used for focused/unfocused judgment (hereinafter referred to as a reference phase difference) for each part of a picked-up image, judging a state of focus by comparing a phase difference of each part of the picked-up image to be recorded and the reference phase difference, and displaying a judgment result. For example, by causing a phase difference of each part of an image at the time of being focused immediately before recording to be a reference phase difference and detecting change between the reference phase difference and a phase difference of each part of the image to be recorded, it is enabled to display a guide display showing a focused image part.

In the image surface phase difference method, each optical path from an object is divided at an exit pupil, for example, in left and right directions, and a light flux from the right direction (a right light flux) and a light flux from the left direction (a left light flux) are caused to enter an image pickup surface (a light receiving surface) of the image pickup device. Pixels receiving the right light flux (hereinafter referred to as R pixels) and pixels receiving the left light flux (hereinafter referred to as L pixels) are configured on the image pickup device, and images of the right flux and the left flux are separately formed on respective image pickup surfaces of the R pixels and the L pixels (hereinafter, these will be referred to as AF pixels).

A phase difference on the image pickup surface between image signals entering the R pixels and L pixels, respectively, is in proportion to an amount of focus displacement. Therefore, it is possible to calculate an amount of defocus and a direction of defocus using the phase difference obtained from the AF pixels and predetermined arithmetic parameters. Among image pickup pixels of the image pickup section 12, AF pixels are arranged in each part of the screen in addition to ordinary pixels for generating an image, and the amount of focus displacement in each part of the screen can be determined from the pixel values of the AF pixels.

At step S41, the focus judging section 11d reads out a phase difference of each part immediately before photographing as a reference phase difference, from the table 19a. Next, the focus judging section 11d reads out a phase difference of each part recorded in the recording section 19, at step S42. Next, the focus judging section 11d compares the phase difference immediately before photographing and the phase difference of a recorded picked-up image for each part (step S43). Note that a picked-up image outputted from the image pickup section 12 includes data of the ordinary pixels and the AF pixels. The signal processing and control section 11 can take out the data of the AF pixels from the picked-up image before compression processing and acquire the phase difference of each part of the picked-up image.

The focus judging section 11d judges whether or not a phase difference immediately before photographing in an area with a smallest phase difference immediately before photographing, that is, an assumed-to-be-focused part (a reference phase difference) is equal to a phase difference of a same area of the recorded picked-up image, or whether or not the phase difference immediately before photographing has not increased (step S44). If the phase difference of the recorded picked-up image has not increased in comparison with the phase difference immediately before photographing, the assumed-to-be-focused part is caused to be a candidate to be enlargedly displayed (step S45). In this case, the focus judging section 11d may judge that photographing is successful.

If the phase difference of the same area of the recorded picked-up image is larger than the phase difference in the area with the smallest phase difference before photographing, that is, the assumed-to-be-focused part, the signal processing and control section 11 detects a part where the phase difference of the recorded picked-up image has decreased in comparison with the phase difference immediately before photographing among parts other than the assumed-to-be-focused part (step S46). If such a part does not exist, the process transitions to step S45. If such a part exists, the process proceeds to step S47, and the part is caused to be a candidate to be enlargedly displayed.

As described above, here, a change in each area is checked, and it is judged how a phase difference has changed in a same area after photographing, with a phase difference before photographing used as a reference. This method is effective if there is not considerable shaking or a shake of a large object in the screen. However, in the case where a position of an object in the screen changes in comparison before and after photographing, or the like, phase difference change may be judged not for each area but on a basis of a result of pursuing a same image. That is, if the phase difference has increased at S44, it may means that a focusing target merely shook to a horizontally next block. In this case, the image may not be a failed picture. Therefore, object judgment is performed for an object having a same shape or color as an aimed object to pursue it, and, if its phase difference is favorable, the part can be enlarged. The reference phase difference information described above may be decided with use of phase difference information for a same object before and after photographing.

In this case, the process may be designed so that, at S44, phase difference judgment is performed on a basis of a result of pursuing an image to branch to Yes. At S44, comparison for a same area is performed so that, even if the object is displaced to a next block or area, it can be compensated at S46. In this case also, the process branches to Yes, and a focused part is enlarged and can be visually checked. In this case, a block adjoining an area caused to be focused may be intensively detected, or a block significantly away from the block may be ignored. If results of the phase difference change at a plurality of points of focus are held, the results can be used as a reference, so that reliability at a time of judging a state of focus change is enhanced. For example, it becomes possible to judge whether a position of a same object has been displaced, whether an object has completely disappeared and a different object has appeared, and the like in comparison before and after photographing.

The method of using phase difference information about a same block (area) is effective if there is not considerable shaking or a shake of a large object in the screen. However, in the case where a position of an object in the screen changes in comparison before and after photographing, or the like, it is possible to, on an assumption that the object shakes up and down, left and right, judge, not for each area, a phase difference change by using phase difference data of an adjoining area (block) or by a result of pursuing a same image. Here, it is attempted to judge a phase difference change for a same object in comparison before and after photographing by effectively utilizing use of a same area, use of an adjoining area, similar image judgment and the like in such division into areas.

Since there are such uses, it is easily judge after photographing whether an aimed part is focused or not by recording phase difference information from an image at the time of photographing to an image file or the like. In a same way of thinking, it is attempted to judge an object which is focused rather better at the time of photographing than before photographing.

As described above, in the modification in FIG. 9, focus judgment using the image surface phase difference method is possible.

Second Embodiment

Figure 10:
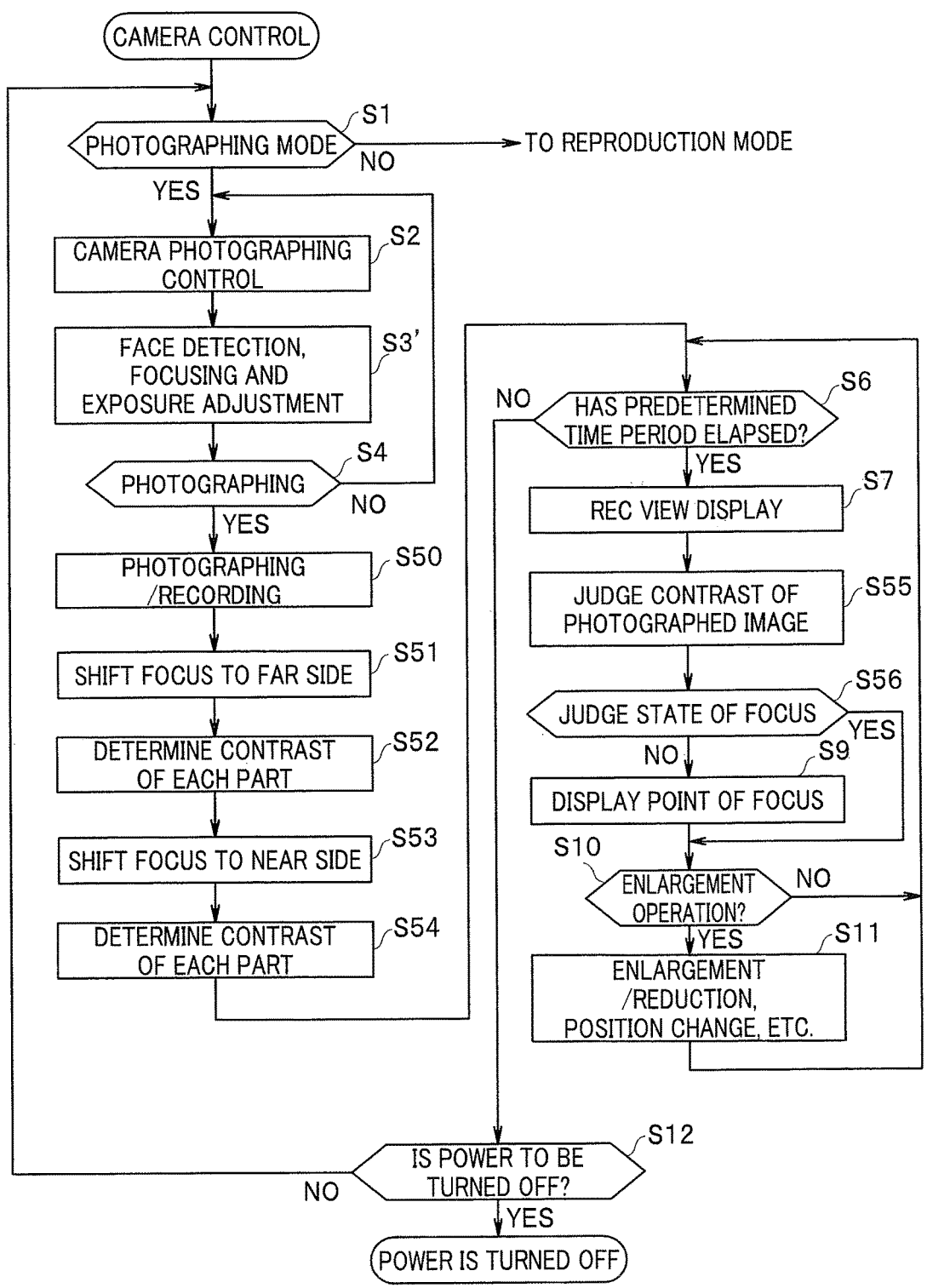
FIG. 10 is a flowchart adopted in a second embodiment of the present invention.
Figure 11:
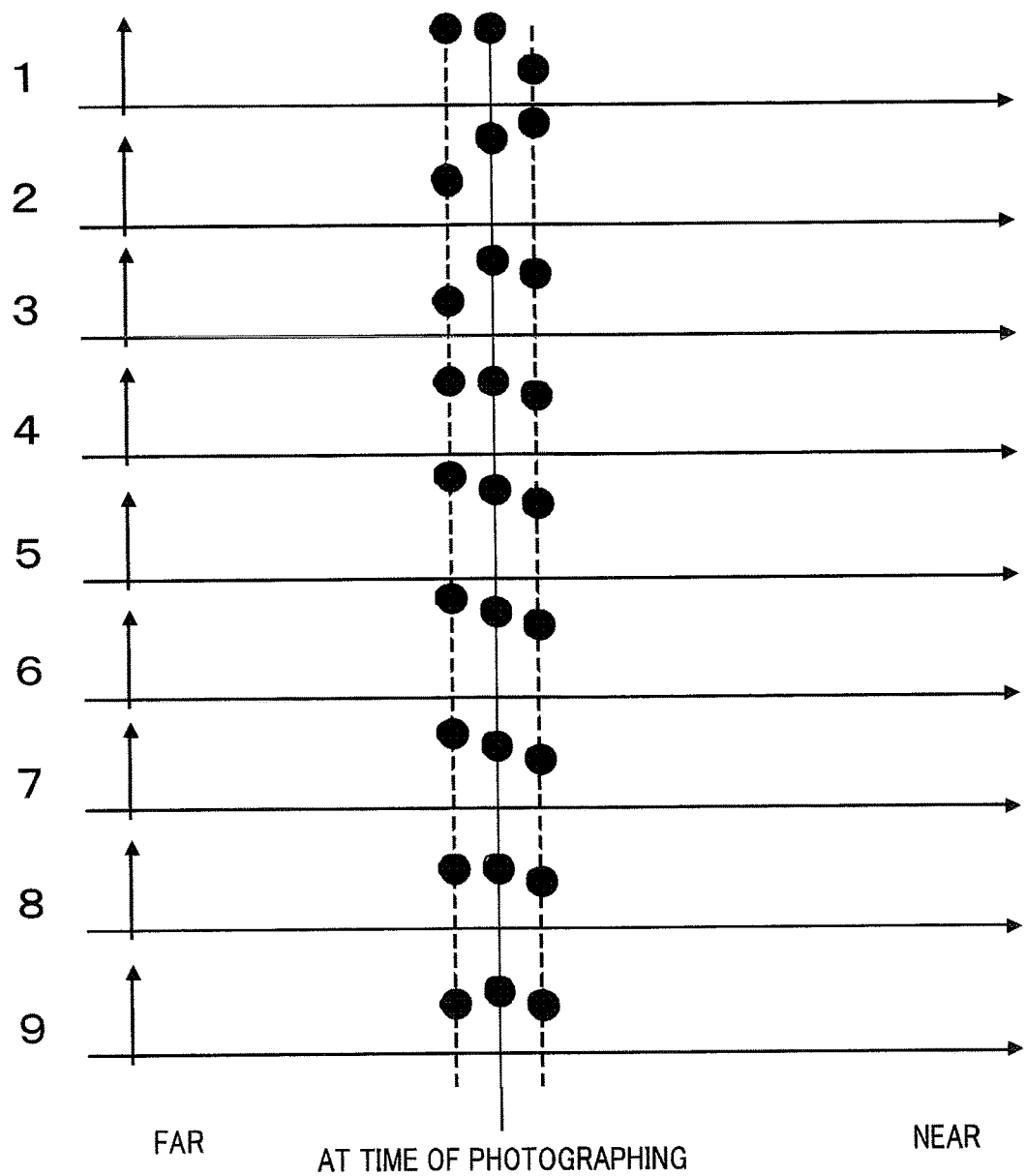
FIG. 11 is an explanatory diagram showing a contrast change in each of areas 1 to 9 denoted by numerals 1 to 9 in FIG. 5 with circles, wherein a horizontal axis indicates a point of focus.

FIG. 10 is a flowchart adopted in a second embodiment of the present invention. In FIG. 10, same procedures as those in FIG. 4 are given same reference numerals, and explanation thereof will be omitted. Note that, in FIG. 10, an operation flow at the time of reproduction is omitted and not shown. A hardware configuration of the present embodiment is similar to that of the first embodiment. FIG. 11 is an explanatory diagram showing a contrast change in each of the areas 1 to 9 denoted by numerals 1 to 9 in FIG. 5 with circles, wherein a horizontal axis indicates a point of focus.

In the first embodiment, a state of focus is judged by causing a contrast of each part immediately before photographing to be a reference contrast at the time of being focused and comparing the reference contrast and a contrast of each part of a picked-up image to be recorded. In a case where auto-focusing is not performed but manual focusing is performed immediately before photographing, however; contrast judgment may not be performed at many points of focus. Therefore, it is conceivable that an amount of contrast change according to a point of focus required for focus judgment cannot be recorded in each part of an image.

Therefore, in the present embodiment, by causing a wobbling operation for causing a lens to slightly vibrate at a high speed to be performed immediately after photographing, a contrast of each part used for focus judgment after photographing is acquired as a reference contrast. By performing the wobbling operation for a very short time period after photographing, a reference contrast can be determined for an image within a photographing range substantially similar to that at the time of photographing.

By the wobbling operation, two reference contrasts in states that a point of focus being displaced to a far side and a near side relative to the point of focus at the time of photographing, are determined for each part. A contrast at the time of photographing can be acquired from a picked-up image to be recorded. On a basis of whether or not the contrast at the time of photographing is larger than the two reference contrasts in the case of displacing the point of focus to the far side and the near side in each part of the picked-up image, a state of focus in each part can be judged.

At step S3' in FIG. 10, the process similar to that of step S3 in FIG. 4 is performed. At step S3' in the present embodiment, however, contrast judgment and recording processing are not necessary. At step S50, photographing and recording of a picked-up image are performed in response to a photographing operation.

At next step S51, the contrast judgment recording section 11c displaces the point of focus at the time of photographing to the far side. At next step S52, the contrast judgment recording section 11c is given a picked-up image from the image pickup section 12 and determines a contrast of each part. In this way, the contrast of each part is determined at the point of focus displaced to the far side relative to the point of focus at the time of photographing.

Similarly, the contrast judgment recording section 11c displaces the point of focus to the near side from the point of focus at the time of photographing at step S53, and determines a contrast of each part from an image picked up in that state (step S54). In this way, the contrast of each part is determined at the point of focus displaced to the near side relative to the point of focus at the time of photographing.

At step S55, the contrast judgment recording section 11c determines a contrast of each part of the picked-up image to be recorded, that is, a contrast of each part at the time of photographing. A judgment result of the contrast judgment recording section 11c is given to the focus judging section 11d.

The focus judging section 11d judges a state of focus at step S56. That is, for each part of the picked-up image, the focus judging section 11d compares the contrast at the time of photographing and the contrasts in the case of displacing the point of focus to the far side and the near side. If the contrast at the time of photographing is larger than both of the reference contrasts in the case of displacing the point of focus to the far side and the near side, in an assumed-to-be-focused part, the focus judging section 11d causes the assumed-to-be-focused part to be a candidate for being enlargedly displayed. In this case, the focus judging section 11d may judge that photographing is successful with regard to focusing.

If the contrast at the time of photographing is smaller than any one of the contrasts in the case of displacing the point of focus to the far side and the near side in the assumed-to-be-focused part, the focus judging section 11d judges whether or not the contrast at the time of photographing is larger than both of the contrasts in the case of displacing the point of focus to the far side and near side, for each of parts other than the assumed-to-be-focused part. If such a part does not exist, the assumed-to-be-focused part is caused to be a candidate for being enlargedly displayed. If such a part exists, the part is caused to be a candidate for being enlargedly displayed.

In FIG. 11, the contrast in the case of displacing the point of focus to the far side is larger in comparison with the contrast at the time of photographing in the area 5. On the other hand, as for the area 3, the contrast at the time of photographing is larger than both of the contrasts in the case of displacing the point of focus to the far side and the near side. Therefore, in an example of FIG. 11, the area 3 is set to be a candidate for being enlargedly displayed. In this case also, it is possible to not only compare a same area (block) before and after photographing but also judge about being focused or not on a basis of a contrast change in an adjoining block, in consideration of a case where an object moves vertically or horizontally and to a next block. It goes without saying that a result of pursuing the object may be used together. The method of making a judgment for a same area is effective if there is not considerable shaking or a shake of a large object in the screen. However, in the case where a position of an object in the screen changes in comparison before and after photographing, or the like, it is possible to, on an assumption that the object shakes up and down, left and right, judge, not for each area, a contrast change by using contrast data of an adjoining area (block) or by a result of pursuing a same image. Here, it is attempted to judge a contrast change for a same object in comparison before and after photographing as far as possible by effectively utilizing use of a same area, use of an adjoining area, similar image judgment by such division into areas, and, in a similar way of thinking, it is also attempted to judge such an object that is better focused at the time of photographing than before photographing.

Other operations and advantages are similar to those of the first embodiment. The present embodiment is capable of surely performing focus judgment even in a case where a contrast change to an extent enabling focus judgment cannot be detected immediately before photographing.

Note that it is possible to accentuate a contrast change by opening the diaphragm. Therefore, the diaphragm may be opened prior to step S51. The above explanation has been made on an assumption that the contrast immediately before photographing is not recorded. However, in a case where effective contrast recording is performed immediately before photographing, a state of focus may be judged by comparing a contrast of each part immediately before photographing and a contrast of each part of a picked-up image to be recorded, similarly to the first embodiment.

Third Embodiment

Figure 12:
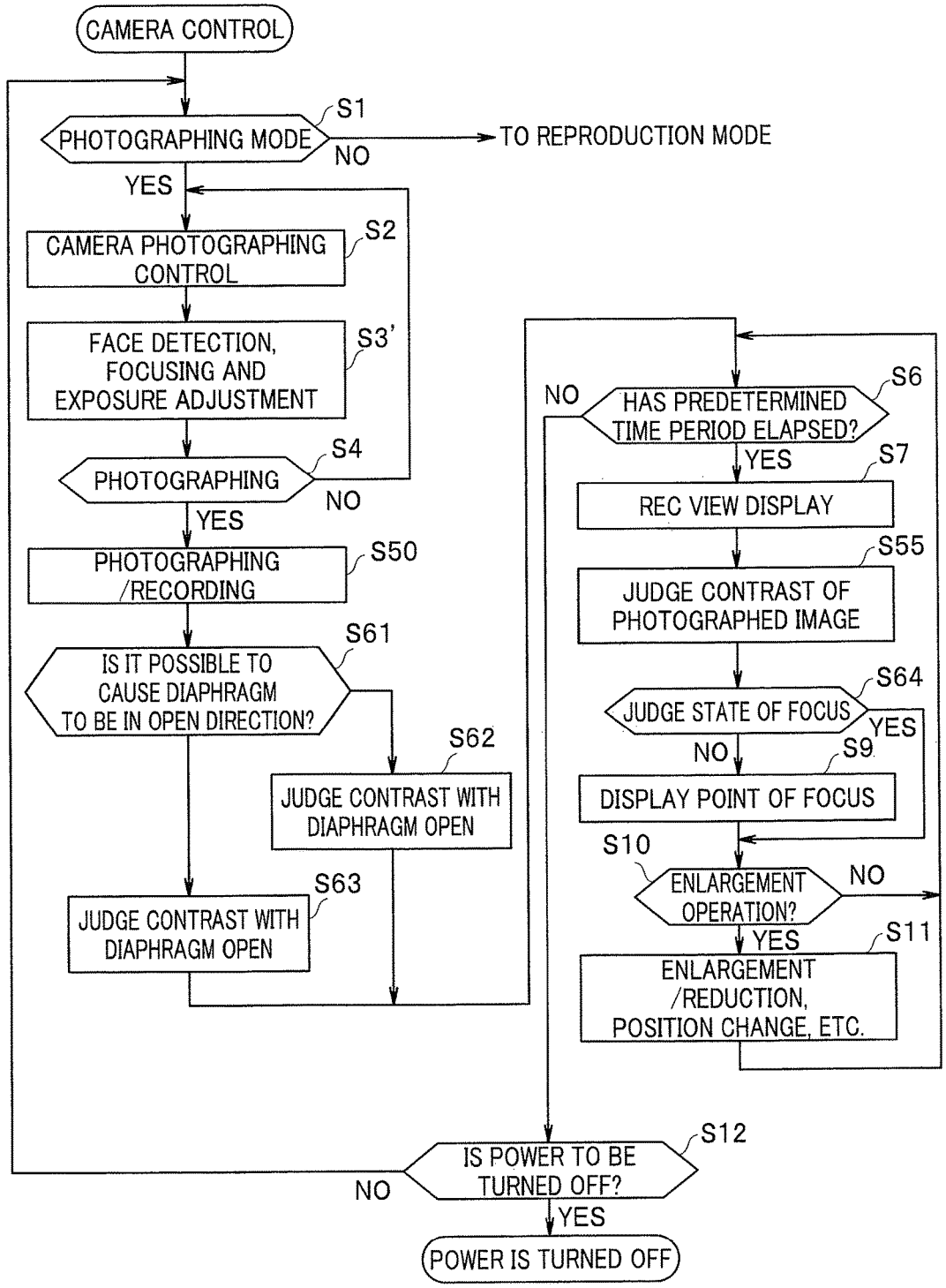
FIG. 12 is a flowchart adopted in a third embodiment of the present invention.
Figure 13:
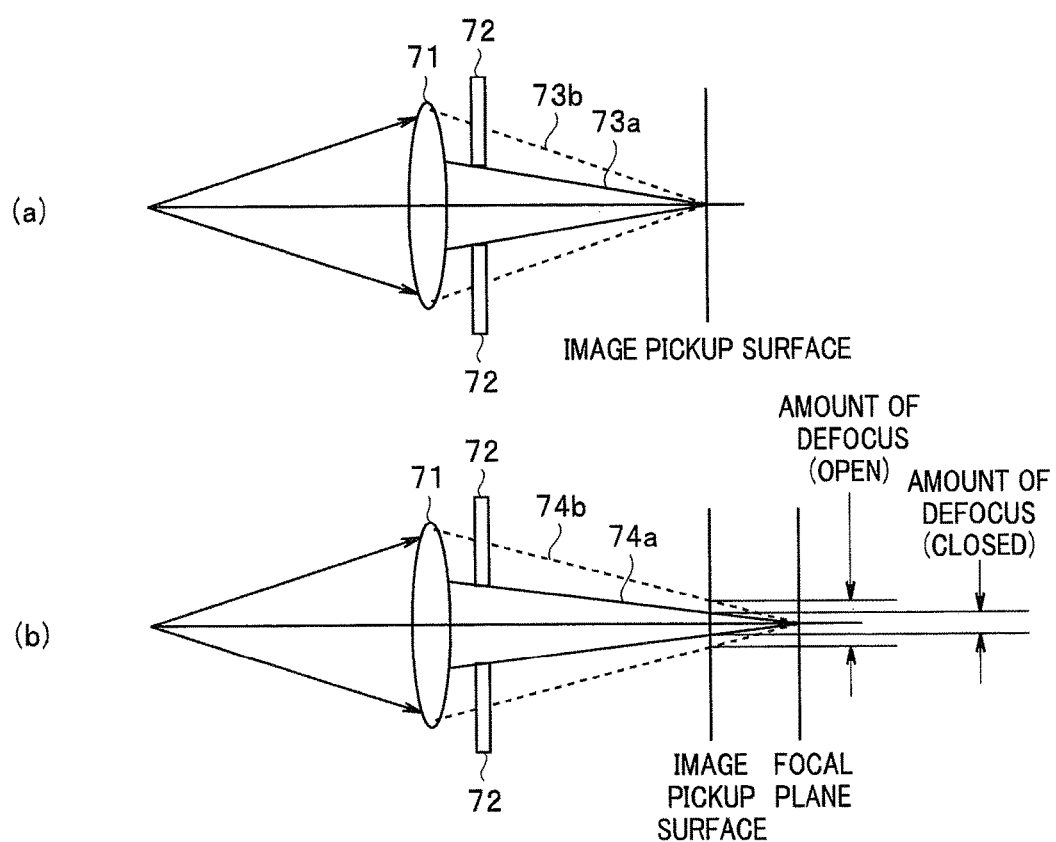
FIG. 13 is an explanatory diagram for explaining a relationship between a diaphragm and an amount of defocus (contrast)
Figure 14:
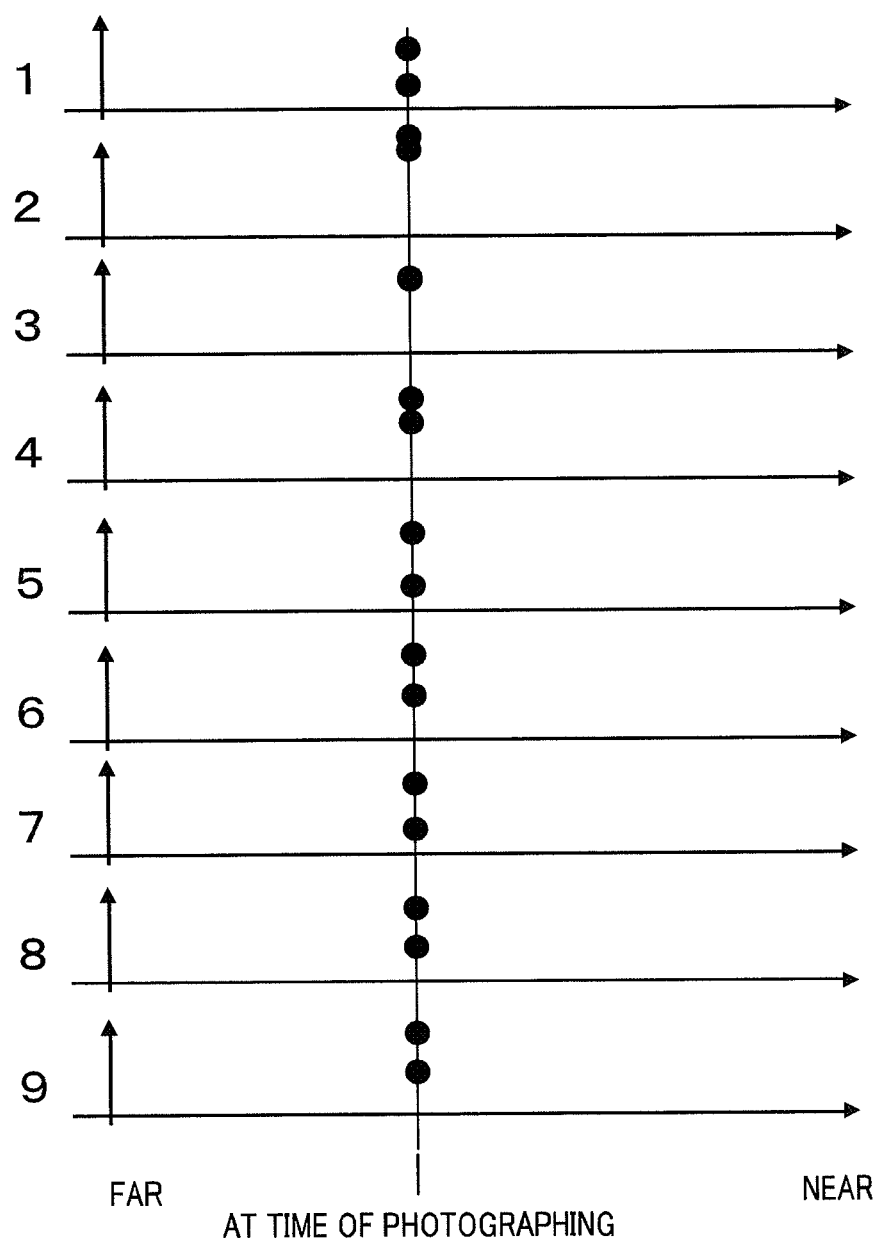
FIG. 14 is an explanatory diagram showing a contrast change in each of areas 1 to 9 denoted by numerals 1 to 9 in FIG. 5 with circles, wherein a horizontal axis indicates a point of focus.

FIG. 12 is a flowchart adopted in a third embodiment of the present invention. In FIG. 12, same procedures as those in FIG. 10 are given same reference numerals, and explanation thereof will be omitted. A hardware configuration of the present embodiment is similar to that of the first embodiment. FIG. 13 is an explanatory diagram for explaining a relationship between the diaphragm and an amount of defocus (contrast). FIG. 14 is an explanatory diagram showing a contrast change in each of the areas 1 to 9 denoted by numerals 1 to 9 in FIG. 5 with circles, wherein a horizontal axis indicates a point of focus.

In the second embodiment, a state of focus is judged by comparing a contrast of each part at the time of photographing and a reference contrast of each part in a case of changing a point of focus to a far side and near side immediately after photographing. The present embodiment is for judging the state of focus by causing a contrast of each part in a case of changing the diaphragm immediately after photographing to be a reference contrast and comparing a contrast of each part at the time of photographing and the reference contrast of each part.

FIG. 13(a) shows a state of being focused and shows that a light emitted from an object is led to an image pickup surface through a lens 71. A light beam 73a from the lens 71 shows a case where a diaphragm 72 is in a closed state, and a light beam 73b from the lens 71 (a broken line) shows a case where the diaphragm 72 is in an open state. In a case of being focused, an image is formed on an image pickup surface by a light beam from the lens 71 irrespective of the open/closed state of the diaphragm 72.

On the other hand, FIG. 13(b) shows a state of being unfocused. An example of FIG. 13(b) shows that a focus is displaced to a near side, and a focal plane is positioned at a position displaced from the image pickup surface. When the diaphragm 72 is in the closed state, a light beam from the lens 71 is indicated by a solid-line light beam 74a, and, when the diaphragm is in the open state, the light beam from the lens 71 is indicated by a broken-line light beam 74b. When the diaphragm 72 is in the closed state, a light emitted from a point light source is received on the image pickup surface, spreading by an amount of displacement (closed) in FIG. 13(b). When the diaphragm 72 is in the open state, a light emitted from the point light source is received on the image pickup surface, spreading by an amount of displacement (open) in FIG. 13(b).

It is seen from FIGS. 13(a) and 13(b) that an amount of defocus at the time of being focused and at a time of being unfocused is relatively small when the diaphragm is in the closed state, and the amount of defocus at the time of being focused and at the time of being unfocused is relatively large when the diaphragm is in the open state. The amount of defocus and a contrast correspond to each other, and it is known that, the smaller an amount of change between a contrast at the time of photographing and a contrast in a case of changing the diaphragm is, the closer a state is to the focused state, and that, the larger the amount of change is, the larger an amount of focus displacement is.

In the present embodiment, a contrast of each part is acquired by changing the diaphragm immediately after photographing. Note that, in this case also, it is better to perform opening/closing of the diaphragm and contrast judgment in a very short time period after photographing.

At step S61 in FIG. 12, the contrast judgment recording section 11c performs communication with the control section 23 of the interchangeable lens 20 and judges whether or not the diaphragm not shown can be changed into an open direction. In the case where the diaphragm is in the closed state, it is necessary to slow a shutter speed to receive a sufficient amount of light, and it becomes difficult to perform measurement in a short time period immediately after photographing. Therefore, it is better to change the diaphragm into the open direction as far as possible to determine a contrast.

If it is possible to change the diaphragm into the open direction, the contrast judgment recording section 11c can change the diaphragm not shown into the open direction by the control section 23. At step S62, the contrast judgment recording section 11c is given a picked-up image from the image pickup section 12 and determines a contrast of each part in the state that the diaphragm is open. In this way, a reference contrast of each part in a diaphragm state different from a diaphragm state at the time of photographing is determined.

If it is not possible to change the diaphragm into the open direction, the contrast judgment recording section 11c controls the control section 23 to change the diaphragm into a closed direction. In this case, the contrast judgment recording section 11c determines the reference contrast of each part at step S63. In this way, at step S62 or step S63, the reference contrast of each part in a diaphragm state different from a diaphragm state at the time of photographing is determined.

At step S55, the contrast judgment recording section 11c determines a contrast of each part of the picked-up image to be recorded, that is, a contrast of each part at the time of photographing. A judgment result of the contrast judgment recording section 11c is given to the focus judging section 11d.

The focus judging section 11d judges a state of focus at step S64. That is, among the respective parts of the picked-up image, the focus judging section 11d compares an amount of change between the contrast at the time of photographing and the contrast in the case of changing the diaphragm state. The focus judging section 11d judges whether or not the amount of change between the contrasts is the smallest in an assumed-to-be-focused part. If the amount of change between the contrasts is the smallest in the assumed-to-be-focused part, the focus judging section 11d causes the assumed-to-be-focused part to be a candidate for being enlargedly displayed. In this case, the focus judging section 11d may judge that photographing is successful with regard to focusing.

If the amount of change between the contrasts is relatively large in the assumed-to-be-focused part, the focus judging section 11d judges, for each of parts other than the assumed-to-be-focused part, whether the amount of change between the contrasts is sufficiently small or not. If such a part does not exist, the assumed-to-be-focused part is caused to be a candidate for being enlargedly displayed. If such a part exists, the part is caused to be a candidate for being enlargedly displayed.

Black circles in FIG. 14 indicate reference contrasts in a case of changing the contrast and the diaphragm at the time of photographing for the respective areas 1 to 9. If positions of two black circles correspond to each other, it can be judged that the state of focus is obtained. An amount of focus displacement can be judged to be larger as a distance between the two circles is longer. In an example of FIG. 14, a difference between the contrast at the time of photographing and the contrast in the case of changing the diaphragm is relatively large in the area 5. On the other hand, as for the area 3, the contrast at the time of photographing and the contrast in the case of changing the diaphragm correspond to each other. Therefore, in the example of FIG. 14, the area 3 is set to be a candidate for being enlargedly displayed.

Other operations and advantages are similar to those of the second embodiment. Note that, the above explanation also has been made on the assumption that the contrast immediately before photographing is not recorded. However, in the case where effective contrast recording is performed immediately before photographing, a state of focus may be judged by comparing a contrast of each part immediately before photographing with a contrast of each part of a picked-up image to be recorded, similarly to the first embodiment.

Fourth Embodiment

Figure 15:
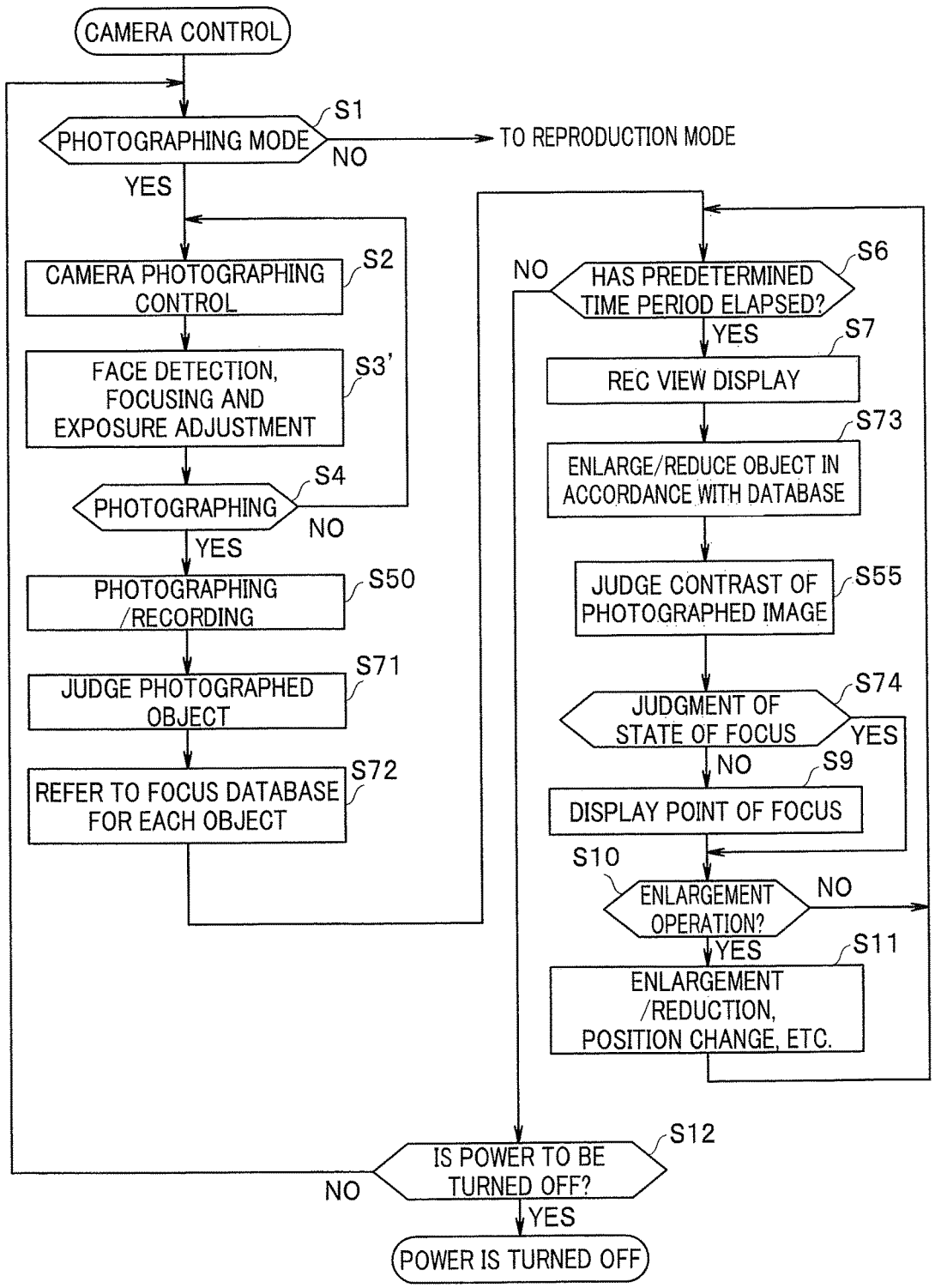
FIG. 15 is a flowchart adopted in a fourth embodiment of the present invention.

FIG. 15 is a flowchart adopted in a fourth embodiment of the present invention. In FIG. 15, same procedures as those in FIG. 12 are given same reference numerals, and explanation thereof will be omitted. A hardware configuration of the present embodiment is similar to that of the first embodiment. FIG. 16 is an explanatory diagram for explaining contents of a focus database adopted in the present embodiment.

In each of the above embodiments, a state of focus is judged by judging a contrast by changing a point of focus immediately before photographing, a point of focus immediately after photographing or the diaphragm immediately after photographing. In comparison, in the present embodiment, a focus database is used which holds information such as a reference contrast at the time of being focused, which is specified, for each object (target object) or photographing environment in advance, and the state of focus is judged by comparing object information such as a contrast of each part of a picked-up image to be recorded and information such as a reference contrast read out from the focus database, without changing photographing parameters.

FIG. 16 shows contents of the focus database recorded in the recording section 19. In FIG. 16, human eyes and characters are shown as examples of a target object. It is thought that a certain contrast can be obtained from eyelashes near human eyes, characters and the like in a state of focus. In this case, for example, under a bright environment, a value of the contrast is relatively high, and the value of the contrast is relatively low under a dark environment. For each target object and for each environment, a contrast thought to be obtained at the time of being focused is described in the focus database as a reference contrast.

In an example of FIG. 16, it is shown that, as for human eyes, a reference contrast Cont1 is obtained at the time of being focused in bright outdoors, and a reference contrast Cont2 is obtained at the time of being focused in dark indoors. Similarly, as for characters, a reference contrast Cont3 is obtained at the time of being focused in bright outdoors, and a reference contrast Cont4 is obtained at the time of being focused in dark indoors.

As for a contour width of an image of human eyes also, it is thought that a prescribed value can be obtained at the time of being focused. As this value, a reference contour width for the bright outdoors and a reference contour width for the dark indoors are set in the focus database.

Furthermore, the contrast judgment recording section 11*c* has a function of updating the focus database recorded in the recording section 9. Present state newly set 1 (pattern judgment) and Present state newly set 2 (pattern judgment) in FIG. 16 indicate information updated and recorded by the contrast judgment recording section 11*c*. The contrast judgment recording section 11*c* performs object detection and brightness detection for an actual picked-up image, and records, for each detected object for each photographing environment, a contrast obtained at the time of being focused, as a reference contrast. The contrast judgment recording section 11*c* may be provided with a learning function of updating the reference contrast to an optimal reference contrast by holding a history about photographing of a same object in the recording section 9 or the like.

At step S71 in FIG. 15, the face detecting section. 11*b* detects objects in a picked-up image. For each detected object, the contrast judgment recording section 11*c* refers to information in the focus database (step S72). At step S73, the contrast judgment recording section 11*c* causes sizes of the objects in the picked-up image to sizes of the objects assumed in the focus database, by enlarging or reducing the sizes of the objects. In this state, the contrast judgment recording section 11*c* determines a contrast of each object in the photographed image (step S55). A judgment result of the contrast judgment recording section 11*c* is given to the focus judging section 11*d*.

The focus judging section 11*d* judges a focused state at step S74. That is, for each object in the picked-up image, the focus judging section 11*d* compares a contrast of the picked-up image and a reference contrast described in the focus database. The focus judging section 11*d* judges whether or not a difference between the contrast of the picked-up image and the reference contrast is the smallest in an assumed-to-be-focused part. If the difference between the contrasts is the smallest in the assumed-to-be-focused part, the focus judging section 11*d* causes the assumed-to-be-focused part to be a candidate for being enlargedly displayed. In this case, the focus judging section 11*d* may judge that photographing is successful with regard to focusing.

If, as for the assumed-to-be-focused part, the difference between the contrast of the picked-up image and the reference contrast is relatively large, the focus judging section 11*d* judges, for each of objects other than the assumed-to-be-focused part, whether the contrast difference is sufficiently small or not. If such a part does not exist, the assumed-to-be-focused part is caused to be a candidate for being enlargedly displayed. If such a part exists, the part is caused to be a candidate for being enlargedly displayed.

Note that the focus judging section 11*d* may perform focus judgment using a difference between a contour width of an object in the picked-up image and a reference contour width in the focus database.

Other operations and advantages are similar to those of the third embodiment. Note that, the above explanation also has been made on the assumption that the contrast immediately before photographing is not recorded. However, in the case where effective contrast recording is performed immediately before photographing, a state of focus may be judged by comparing a contrast of each part immediately before photographing with a contrast of each part of a picked-up image to be recorded, similarly to the first embodiment.

Further, though explanation has been made with a digital camera used as an apparatus for photographing in each embodiment of the present invention, a digital single-lens reflex camera, a compact digital camera or a camera for a motion picture like a video camera and a movie camera is also possible as a camera. Further, an internal camera included in a portable information terminal (PDA: personal digital assistant), such as a mobile phone and a smartphone, is, of course, possible. Industrial and medical optical apparatuses such as an endoscope and a microscope are also possible. In addition to a photographing apparatus, it becomes possible to provide an observation device or a display device making it possible to accurately observe an image desired by a user, by such devised ways and means.

For a display apparatus for judging failure in photographing also, in addition to a photographing apparatus, a technique for judging characteristics of an image and giving a user a suggestion, a teaching and an advice for next-time photographing is important. If setting information about a camera is included in an image file to be analyzed, it is also possible to include contrast information as a characteristic of an image.

The present invention is not limited to each of the above embodiments immediately, and the components can be modified and embodied within a range not departing from spirit of the invention at a stage of practicing the invention. Further, various inventions can be formed by appropriately combining a plurality of components disclosed in each of the above embodiments. For example, some of all the components shown in the embodiments may be deleted. Further, components in different embodiments may be appropriately combined.

Note that, even if an operation flow in the claims, the specification and the drawings is explained with "first", "next" or the like for convenience, it does not mean that it is essential to perform the operation flow in that order. It goes without saying that, as for each of steps constituting the operation flow, such a part that does not influence essence of the invention can be omitted appropriately.

In the technique explained here, many of controls and functions explained mainly with a flowchart can be set by a program, and the controls and functions described above can be realized by a computer reading and executing the program. A whole or a part of the program can be recorded or stored in a portable medium such as a nonvolatile memory, for example, a flexible disk and a CD-ROM or a storage medium such as a hard disk and a volatile memory as a computer program product and distributed or provided at a time of shipment of the product or by a portable medium or through a communication line. A user can easily realize the photographing apparatuses of the present embodiments by downloading the program via a communication network and installing the program into a computer or by installing the program into the computer from a recording medium.

What is claimed is:

1. A photographing apparatus comprising:
an image pickup device picking up an optical image of an object through an image pickup optical system to obtain a picked-up image, the image pickup device being provided with divided pixels for receiving light on respective optical paths from the object divided in left and right directions;
a recording medium recording the picked-up image;
a display displaying the picked-up image; and
a processor comprising a focus judging section judging a state of focus of the image pickup optical system using a phase difference on an image pickup surface between image signals based on optical images respectively entering the divided pixels, the focus judging section judges whether or not the phase difference of each area of the picked-up image to be recorded immediately before photographing is equal to or has not increased in comparison with the phase difference of the recorded picked-up image in a same area, to determine a candidate area for an enlarged display.

2. The photographing apparatus according to claim 1, wherein the focus judging section judges the object having a same shape and/or color in the picked-up images before and after the photographing, and determines the candidate area for the enlarged display using phase difference information about the object before and after the photographing.

3. The photographing apparatus according to claim 1, wherein the focus judging section, if there is a different object in the same area before and after the photographing, determines the candidate area of the enlarged display by a change in the phase difference of a same object pursued, instead of the phase difference for each area.

4. The photographing apparatus according to claim 1, wherein the focus judging section determines the object whose optical image has an improved focus state in comparison with the optical image of the object before the photographing, to be the candidate area of the enlarged display.

5. The photographing apparatus according to claim 1, wherein the processor further comprises a display control section that enlargedly displays the candidate area on the display.

6. A photographing method comprising:
picking up an optical image of an object by an image pickup section provided with pixels for receiving light on respective optical paths from the object divided in left and right directions through an image pickup optical system to obtain a picked-up image;
recording and displaying the picked-up image;
judging a state of focus of the image pickup optical system using a phase difference on an image pickup surface between image signals based on optical images respectively entering the divided pixels; and
judging whether or not the phase difference of each area of the picked-up image to be recorded immediately before photographing is equal to or has not increased in comparison with the phase difference of the recorded picked-up image in a same area, to determine a candidate area for an enlarged display.

7. The photographing method according to claim 6, further comprising:
enlargedly displaying the candidate area on a display.

8. A photographing apparatus comprising:
an imaging pickup device picking up an optical image of an object through an image pickup optical system to obtain a picked-up image, the image pickup device being provided with divided pixels for receiving light from respective optical paths from the object divided in different directions;
a recording medium recording the picked-up image;
a display displaying the picked-up image; and a focus judging processor judging a state of focus of the image pickup optical system using a phase difference on an image pickup surface between image signals based on optical images respectively entering the divided pixels, the focus judging processor judges whether or not the phase difference of each area of the picked-up image to be recorded immediately before photographing is equal to or has not increased in comparison with the phase difference of the recorded picked-up image in a same area, wherein when the focus judging processor judges that the phase difference of an area of the pick-up image to be recorded immediately before photographing is equal to or has not increased in comparison with the phase difference of the recorded picked-up image in the same area, the area of the recorded picked-up image is determined to be a candidate area for an enlarged display.

9. A photographing apparatus comprising:
an image pickup device picking up an image of an object to obtain a picked-up image;
a display displaying the picked-up image; and
a processor comprising:
   a contrast judging section acquiring, for each of parts of a first picked-up image obtained by the image pickup device performing image pickup at a first timing, a reference contrast to be used for focus/unfocused judgment, the reference contrast being a point of focus determined by the contrast judging section to have a maximum value of contrast;
   the contrast judging section determining a recorded image contrast of each of parts of a second picked-up image obtained by the image pickup device performing image pickup for recording at a second timing later than the first timing;
   a focus judging section judging, for each of the parts of the second picked-up image, a state of focus of the second picked-up image by comparing the reference contrast with the recorded image contrast for each of the parts of the second picked-up image; and
   a display control section displaying a guide display on the display, the guide display identifying a candidate area within the second picked up image to be displayed on the display, the candidate area being a part of the second picked up image judged by the focus judging section to have a contrast equal to or higher than the reference contrast,
wherein the state of focus of the second picked up image is judged by the focus judging section to be in a focused state when the contrast of the candidate area is equal to or higher than the reference contrast.

10. A photographing apparatus comprising:
an image pickup device picking up an image of an object to obtain a picked-up image;
a display displaying the picked-up image; and
a processor comprising:
   a contrast judging section acquiring, for each of parts of a first picked-up image obtained by the image pickup device performing image pickup at a first timing, a reference contrast to be used for focus/unfocused judgment, the reference contrast being a point of focus determined by the contrast judging section to have a maximum value of contrast;
   the contrast judging section determining a recorded image contrast of each of parts of a second picked-up image obtained by the image pickup device performing image pickup for recording at a second timing prior to the first timing;
   a focus judging section judging, for each of the parts of the second picked-up image, a state of focus of the second picked-up image by comparing the reference contrast with the recorded image contrast for each of the parts of the second picked-up image; and
   a display control section displaying a guide display based on a judgment result judged by the focus judging section together with the second picked-up image on the display, the guide display identifying a candidate area to be enlargedly displayed on the display, the candidate area being a part of the second picked-up image judged by the focus judging section to have a contrast equal to or higher than the reference contrast,
wherein the state of focus of the second picked up image is judged by the focus judging section to be in a focused state when the contrast of the candidate area is equal to or higher than the reference contrast.

* * * * *